(12) United States Patent
Hama et al.

(10) Patent No.: US 8,332,779 B2
(45) Date of Patent: Dec. 11, 2012

(54) INFORMATION PROCESSING APPARATUS, METHOD, AND STORAGE MEDIUM CONTAINING INFORMATION PROCESSING PROGRAM WITH ROTARY OPERATION

(75) Inventors: Tatsuya Hama, Kanagawa (JP); Tetsuya Kohno, Kanagawa (JP); Satomi Yonezawa, Kanagawa (JP); Ikuo Terado, Chiba (JP); Takamoto Tsuda, Kanagawa (JP); Katsunori Miura, Tokyo (JP); Kazuhiro Kondo, Tokyo (JP); Yukako Morimoto, Chiba (JP)

(73) Assignees: Sony Corporation, Tokyo (JP); Sony Mobile Communications Japan, Inc., Tokyo (JP)

( * ) Notice: Subject to any disclaimer, the term of this patent is extended or adjusted under 35 U.S.C. 154(b) by 1099 days.

(21) Appl. No.: 11/893,969

(22) Filed: Aug. 17, 2007

(65) Prior Publication Data
US 2007/0300187 A1 Dec. 27, 2007

Related U.S. Application Data

(62) Division of application No. 10/926,520, filed on Aug. 26, 2004, now Pat. No. 7,418,671.

(30) Foreign Application Priority Data

Aug. 28, 2003 (JP) ................................. 2003-304462
Aug. 28, 2003 (JP) ................................. 2003-304493
Aug. 28, 2003 (JP) ................................. 2003-304555

(51) Int. Cl.
*G06F 3/048* (2006.01)

(52) U.S. Cl. ......... 715/830; 715/810; 715/829; 715/834
(58) Field of Classification Search .................. 715/830, 715/810, 829, 834
See application file for complete search history.

(56) References Cited

U.S. PATENT DOCUMENTS

| | | | | |
|---|---|---|---|---|
| 6,252,596 | B1 * | 6/2001 | Garland | 715/810 |
| 6,259,432 | B1 * | 7/2001 | Yamada et al. | 345/159 |
| 6,714,221 | B1 * | 3/2004 | Christie et al. | 715/784 |
| 7,418,671 | B2 * | 8/2008 | Hama et al. | 715/830 |

(Continued)

FOREIGN PATENT DOCUMENTS

JP 7-13727 1/1995

(Continued)

OTHER PUBLICATIONS

IBM Technical Disclosure Bulletin, Oct. 1993, US "Window Scrolling without Scroll Bars", vol. No. 36 Issue No. 10, p. No. 137-138.*

(Continued)

*Primary Examiner* — William Bashore
*Assistant Examiner* — Henry Orr
(74) *Attorney, Agent, or Firm* — Frommer Lawrence & Haug LLP; William S. Frommer; Paul A. Levy

(57) ABSTRACT

There is provided a novel menu selection method in a mobile phone. Also provided is a cursor displaying method with which a user can intuitively recognize a moving direction and moving speed. In addition, a novel scrollbar with which the user can recognize, in a case of displaying menus beyond a display screen, a range currently displayed on a display screen among all the menus and a current cursor position within the menus displayed on the current display screen.

6 Claims, 17 Drawing Sheets

U.S. PATENT DOCUMENTS

| | | | |
|---|---|---|---|
| 2003/0112279 A1 | 6/2003 | Irimajiri | |
| 2004/0100479 A1* | 5/2004 | Nakano et al. | 345/700 |
| 2004/0221243 A1 | 11/2004 | Twerdahl et al. | |
| 2006/0026535 A1* | 2/2006 | Hotelling et al. | 715/863 |
| 2007/0015565 A1* | 1/2007 | Chan | 463/20 |
| 2007/0236475 A1* | 10/2007 | Wherry | 345/173 |

FOREIGN PATENT DOCUMENTS

| | | |
|---|---|---|
| JP | 7 98640 | 4/1995 |
| JP | 9 292963 | 11/1997 |
| JP | 11 65811 | 3/1999 |
| JP | 2000 231371 | 8/2000 |
| JP | 2002 258830 | 9/2002 |
| JP | 2002 259036 | 9/2002 |
| JP | 2003 76460 | 3/2003 |
| JP | 2003 171068 | 6/2003 |

OTHER PUBLICATIONS

Microsoft Support, article id:197676, published Aug. 2002.*

Figure A is an example of AutoScroll in Microsoft Word.*

* cited by examiner

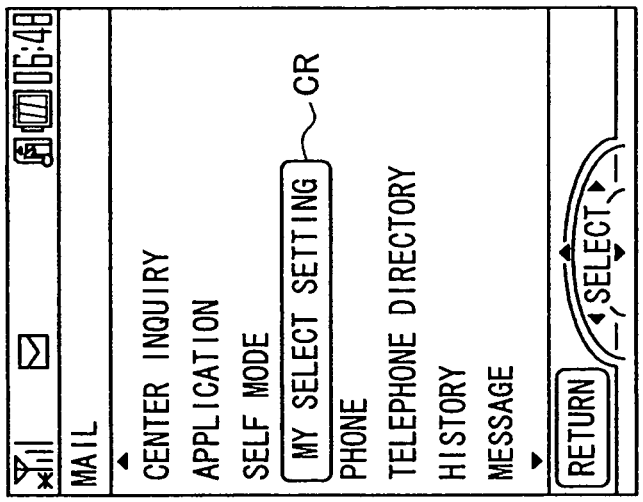
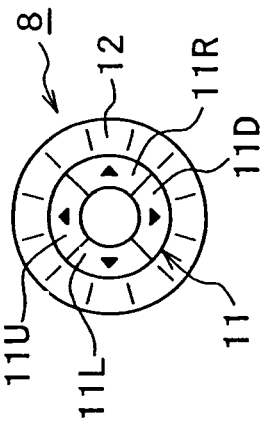
FIG. 3A
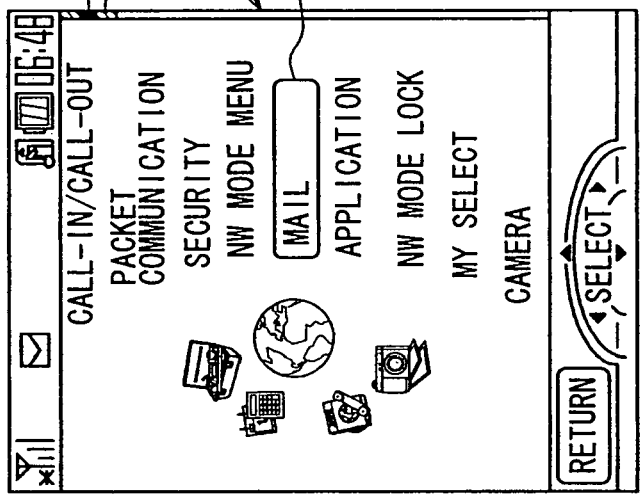
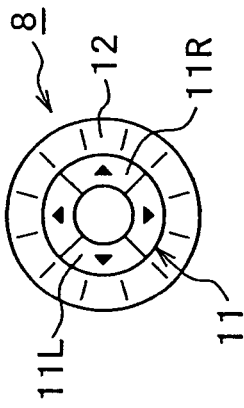
FIG. 3B
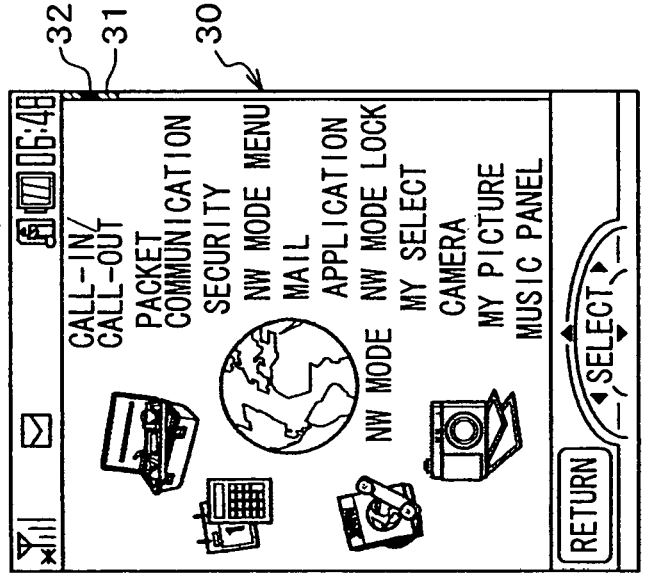
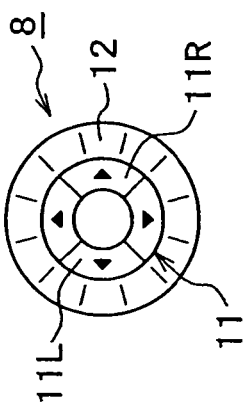
FIG. 3C

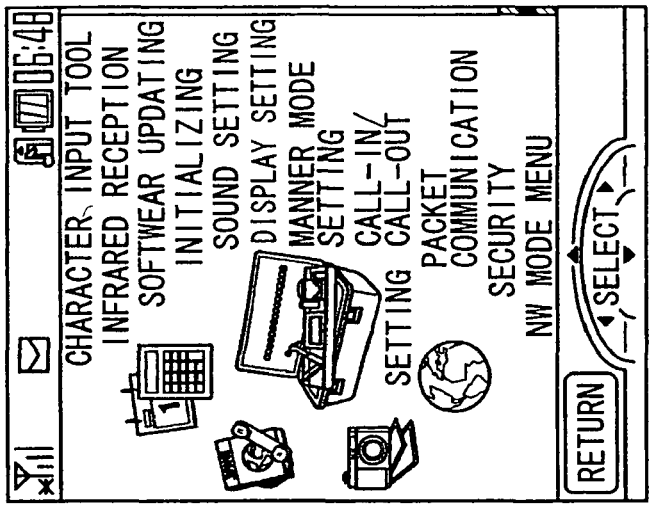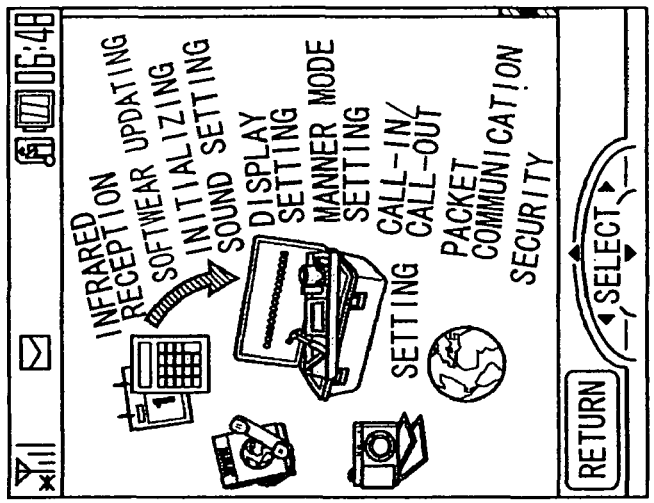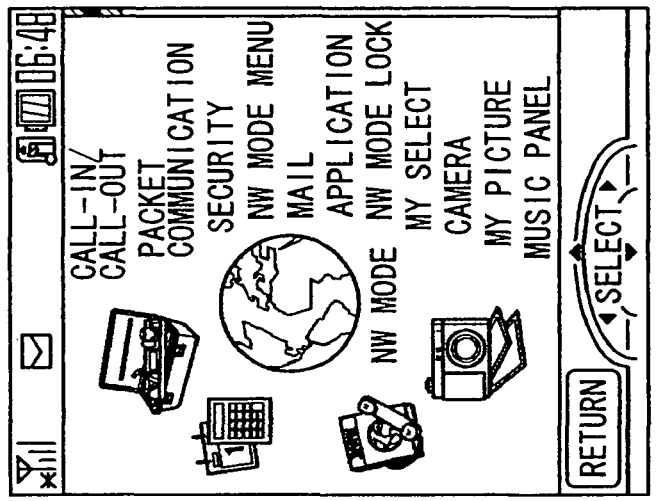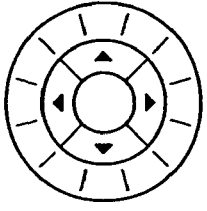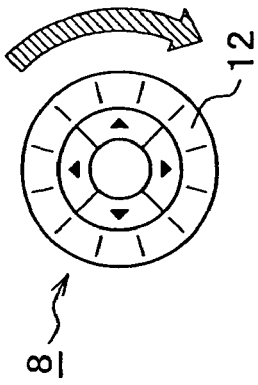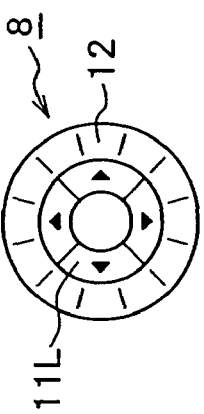

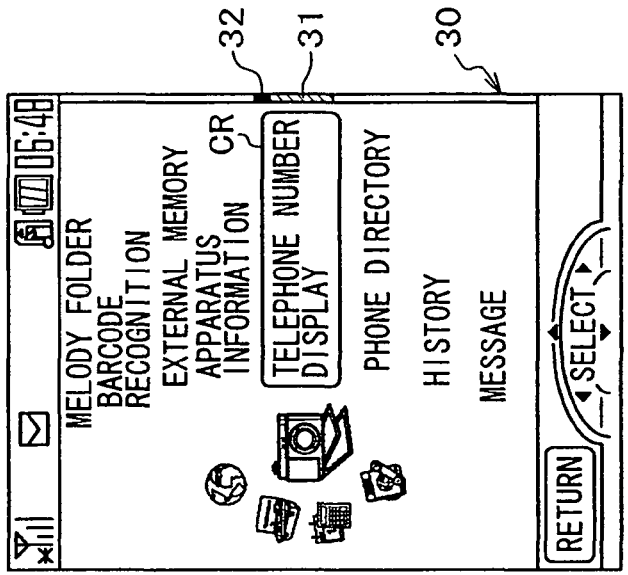
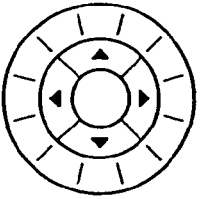
FIG. 6A
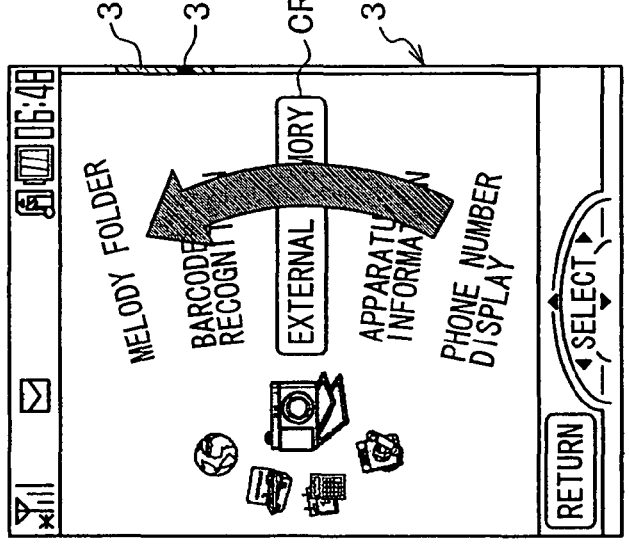
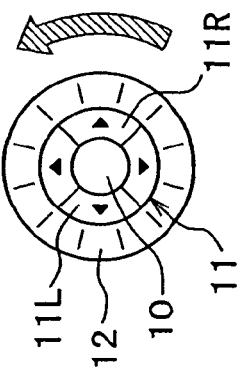
FIG. 6B
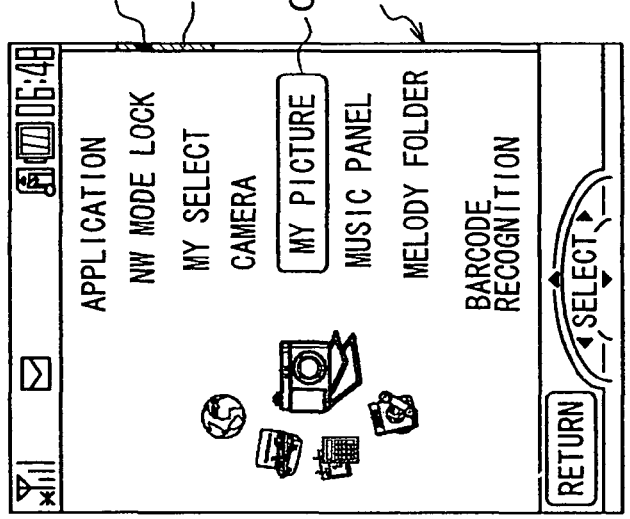
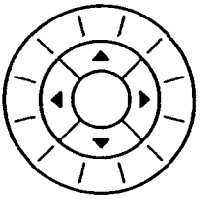
FIG. 6C

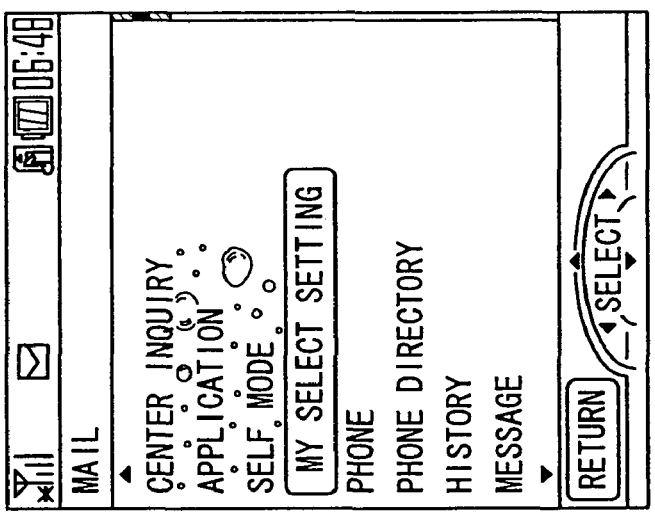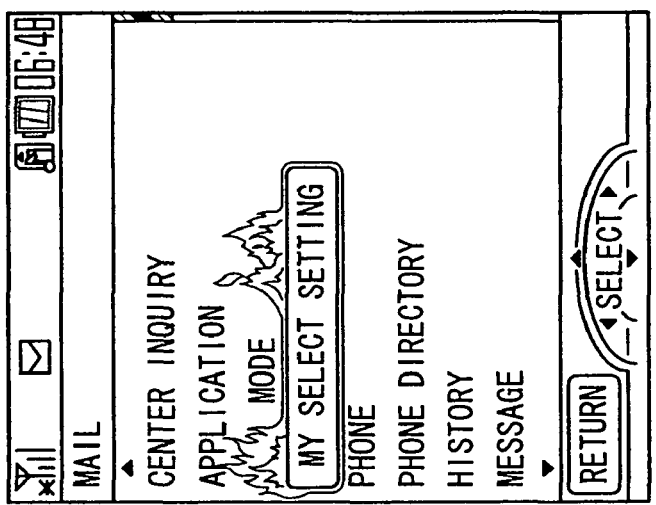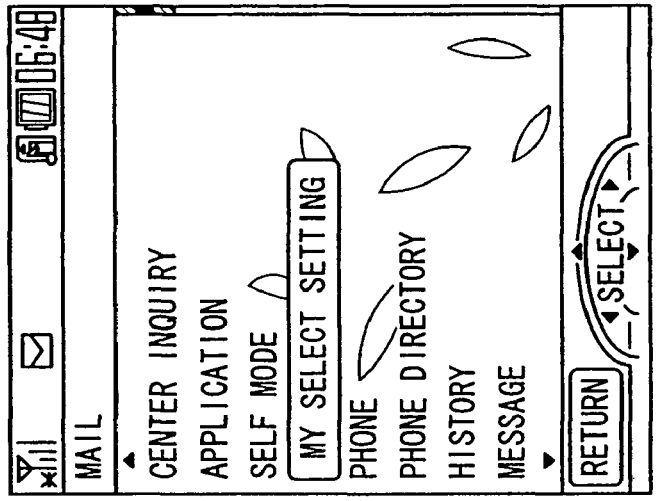

F I G. 1 7
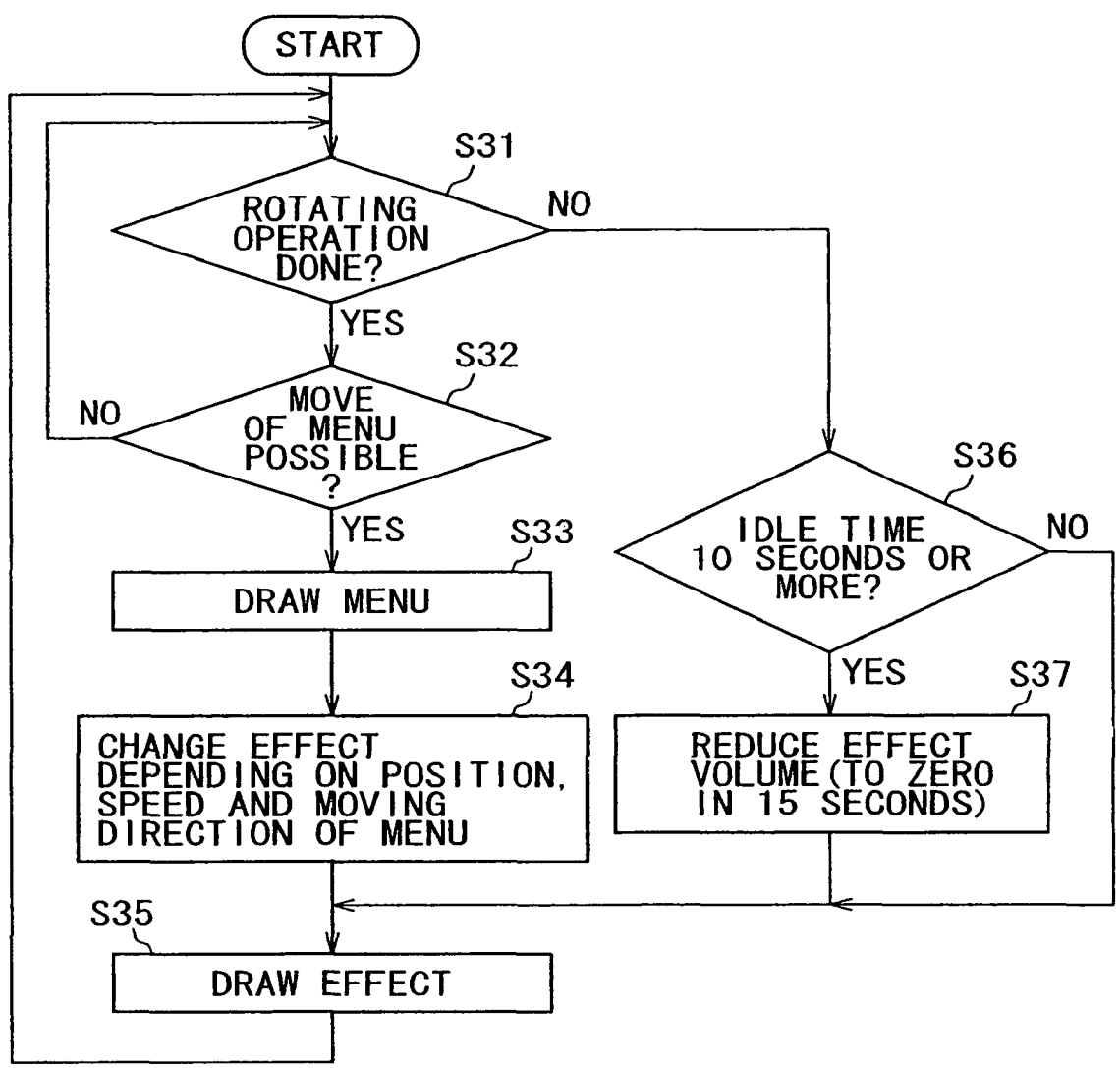

INFORMATION PROCESSING APPARATUS, METHOD, AND STORAGE MEDIUM CONTAINING INFORMATION PROCESSING PROGRAM WITH ROTARY OPERATION

CROSS REFERENCES TO RELATED APPLICATIONS

This is a division of application Ser. No. 10/926,520, filed Aug. 26, 2004 now U.S. Pat. No. 7,418,671, which is entitled to the priority filing date of Japanese applications 2003-304462, 2003-304493 and 2003-304555, all of which were filed in Japan on Aug. 28, 2003, the entirety of which are incorporated herein by reference.

BACKGROUND OF THE INVENTION

1. Field of the Invention

The present invention is to achieve a selection of a desired menu while rotationally displaying menus through an operation of rotating a rotary operation means.

The present invention is also to display a prescribed visual effect that permits a user to recognize intuitively a scroll direction and a scroll speed at the time of the selection of the menu.

The present invention further relates to a scrollbar that indicates a range of displayed menu on a display in the whole menu when it is not allowable to display the whole menu on one display, and also a present cursor position in the displayed menu on the display.

2. Description of Related Art

Conventionally, an information processing apparatus disclosed in Japanese Patent Laid-open No. 2002-196887 is known as a mobile phone system that is adapted to a selection of a menu with a rotary operation means.

In this information processing apparatus, an icon menu display 50 containing a plurality of icons 52 to 61 placed in an annular arrangement is displayed on a display unit 9 of an upper casing 3, and a direction of a turning operation of a jog dial 13 mounted at a prescribed position of a lower casing 4 and being capable of being turned clockwise or counterclockwise is matched, on the icon menu display 50, to a moving direction of a prescribed cursor indicating an arbitrary icon having been selected among the plurality of icons 51 to 62 with the jog dial 13, whereby an erroneous operation on the jog dial 13 is prevented to ensure that an enhanced operability at the time of the selection of the icon is attained.

By the way, a scrollbar display control device disclosed in Japanese Patent Laid-open No. 11-110181 is conventionally known.

This scrollbar display control device is to display, at a position of display data to the whole document data on a scrollbar, a first scroll box 23 of a height corresponding to a ratio (B/A) of a display data volume (B) to the whole document data volume (A) and a second scrollbar 24 of a fixed height predetermined such that an operation with a mouse is easily performed. Then, when the ratio (B/A) is small and the first scroll box is of a small height, dragging of a second scroll box is performed to ensure that an enhanced operability at the time of the dragging with the mouse is attained.

[Patent Document 1]
Japanese Patent Laid-open No. 2002-196867 (Pages 4 to 6 and FIGS. 1 to 6)

[Patent Document 2]
Japanese Patent Laid-open No. 11-110181 (Pages 3 to 4 and FIG. 2)

However, in the conventional mobile phone system, a menu of a hierarchical structure is completely separated for each hierarchy, so that when a menu of a first group of a second hierarchy is selected by mistake, for instance, a reselection of a menu of a second group of the second hierarchy requires a retry of a menu selecting operation after once a return to a menu of a first hierarchy, resulting in a problem of a degraded operability.

Also, a cursor displayed in a case of selecting a menu with the conventional mobile phone system is a monotonous tool merely used to select the menu, and thus, did not allow a user to recognize a moving direction and a moving speed intuitively.

Further, the conventional scrollbar is effective in being capable of recognizing which part among all the menus is displayed on the display, but was not brought to attainment of a recognition so far as the cursor is at which position in the displayed menu on the display. Thus, the conventional scrollbar has been not suited to an operation of moving the cursor while referring to the scrollbar.

SUMMARY OF THE INVENTION

The present invention has been undertaken in view of the above problems and is intended to provide an information processing apparatus, an information processing method, an information processing program and a storage medium containing the information processing program, wherein a selection of a desired menu among a large number of menus may be performed with a satisfactory operability ensured.

The present invention comprises, as means for solving the above problems, storage means containing a plurality of menus, operation means for performing an operation of scrolling the plurality of menus, display means for displaying, on a display unit, the plurality of menus stored in the storage means, and scroll state determination means of determining, depending on the scroll operation performed with the operation means, a scroll speed of the menus and a display angle when a display on the display unit is performed.

The present invention further comprises a display control means of controlling the display means so as to perform a scroll of the plurality of displayed menus on the display unit in a condition where the scroll speed and the display angle determined with the scroll state determination means are added, in a case of detecting a scrolling operation performed by the operation means, and to perform a stop of the scroll of the menus scrolled with the display angle added, and also a display of the menus on the display unit with the menus placed right in front, in a case of detecting an operation of stopping the above scrolling operation.

The present invention is capable of selecting the desired menu among the large number of menus with a satisfactory operability ensured.

The present invention is also intended to provide an information processing apparatus, an information processing method, an information processing program and a storage medium containing the information processing program, wherein a display of a cursor that permits a user to recognize a moving direction and a moving speed intuitively may be performed.

The present invention comprises, as means for solving the above problems, operation means for performing an operation of scrolling the plurality of menus, display means for displaying, on a display unit, the plurality of menus stored in the storage means, and scroll speed determination means of determining a scroll speed of the menus depending on the scroll operation performed with the above operation means.

The present invention further comprises display control means of controlling the display means so as to perform, at the scroll speed determined with the scroll speed determination means, a scroll of the plurality of displayed menus on the display unit, and also a display of a visual effect in which a display volume or a display size is varied depending on the scroll speed determined with the scroll speed determination means, when the scrolling operation of the menus is performed by the operation means.

The present invention allows the user to recognize the moving direction and the moving speed of the cursor intuitively.

The present invention is further intended to provide an information processing apparatus and an information processing method, wherein a display of a scrollbar is performed, in which it is possible not only to recognize which part among all the menus is displayed on the display, but also to recognize so far as the cursor is at which position in the displayed menu on the display.

The present invention comprises, as means for solving the above problems, storage means containing a plurality of menus so as to be classified into prescribed groups respectively, menu display means of displaying a partial range of menus among the plurality of menus stored in the storage means and of displaying, on the display unit, a selection cursor for selecting a desired menu among the displayed partial range of menus, and scroll display means of displaying, on the display unit, a scrollbar having regions corresponding to the number of all the menus stored in the storage means, a first scrolling cursor displayed so as to be movable within the area of the scrollbar and indicating a group to which the menu indicated by the selection cursor among all the menus belongs, and a second scrolling cursor displayed so as to be movable on the first scrolling cursor and indicating the menu indicated by the selection cursor among the above partial range of menus.

The present invention further comprises operation means for performing an operation of scrolling the displayed menus on the display unit, and display control means of controlling the menu display means so as to perform a scroll of the displayed menus on the display unit in response to the menu scrolling operation performed with the operation means, and of controlling the scroll display means so as to move and display the second scrolling cursor in correspondence with the menu in the process of being scrolled, and to, when a change of a group to which the menu indicated by the selection cursor belongs is performed through the above scrolling operation, move and display the first scrolling cursor in correspondence with the above change.

The present invention is capable of providing the scrollbar in which it is possible not only to recognize which part among all the menus is displayed on the display, but also to recognize so far as the cursor is at which position in the displayed menu on the display.

BRIEF DESCRIPTION OF THE DRAWINGS

FIG. 3 is a schematic view of a display for illustrating a hierarchical structure of menus of the mobile phone system.

FIG. 5 is a schematic view of the display for illustrating the scrolling control of a menu of a first hierarchy.

FIG. 6 is a schematic view of the display for illustrating the scrolling control of a menu of a second hierarchy.

FIG. 16 is a view showing an instance of a display given with the visual effect added to a menu of a third hierarchy.

FIG. 17 is a flowchart for illustrating a flow required until the visual effect is added to the menu.

DETAILED DESCRIPTION OF THE PREFERRED EMBODIMENTS

[External Appearance of Mobile Phone System]

Figure 1:
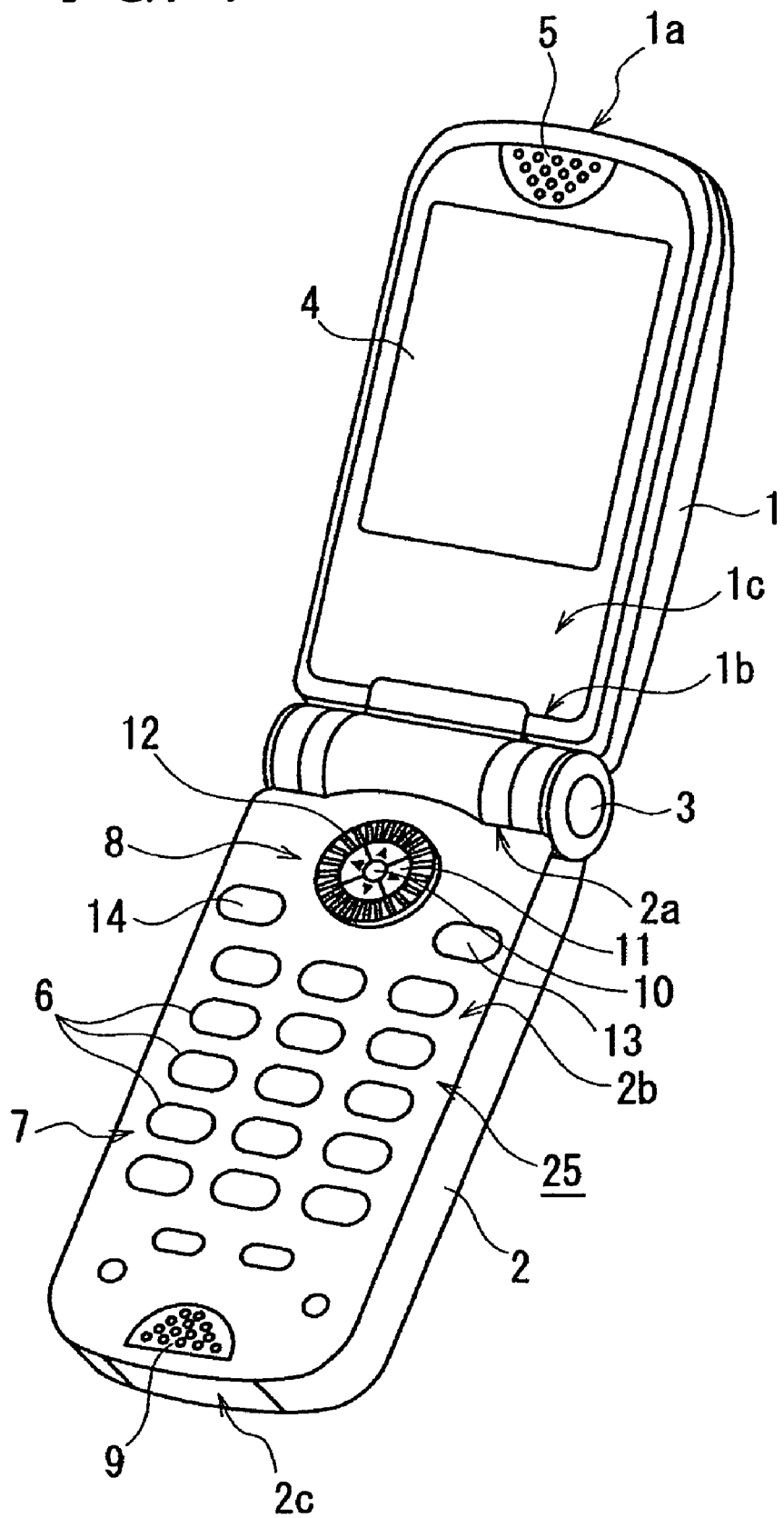
FIG. 1 is a perspective view of a mobile phone system available as the best mode for carrying out the present invention.

FIG. 1 is a perspective view of an external appearance of a mobile phone system available as the best mode for carrying out the present invention.

As seen from FIG. 1, this mobile phone system takes the shape of a so-called foldable mobile phone system. Then, a lower end 1b of an upper casing 1 and an upper end 2a of a lower casing 2 are connected together through a hinge mechanism 3, whereby the upper casing 1 is capable of being turned about the lower casing 2 through the hinge mechanism 3. Incidentally, in FIG. 1, there is shown the external appearance of the mobile phone system when the upper casing 1 and the lower casing 2 are in a so-called double spread condition.

An upper surface 1c (a surface confronting an upper surface 2b of the lower casing 2 at the time when folded up) of the upper casing 1 has a display unit 4 (a liquid crystal display unit, for instance) in which a menu etc. of each hierarchy described later is displayed. The upper surface 1c of the upper casing 1 also has, at a position close to an upper end 1a of the upper casing 1, a speaker unit 5 for outputting voice at the time of speaking etc.

The upper surface 2b (a surface confronting the upper surface 1c of the upper casing 1 at the time when folded up) of the lower casing 2 has a main operation unit 7 formed with a numeric keypad 6 etc., a disc jog dial 8 available as an easy operation unit provided close to the upper end 2a of the lower casing 2, a microphone unit 9 provided close to a lower end 2c of the lower casing 2 to collect speech voice etc., and a right soft key 13 and a left soft key 14 respectively used to switch a menu scroll direction corresponding to a direction of a turning operation of the disc jog dial 8.

[Configuration of Disc Jog Dial]

The disc jog dial 8 has, as an integral unit, an Enter key 10 provided at the center of the disc jog dial 8, a cross key 11 provided around the circumference of the Enter key 10 and a rotary dial 12 provided around the circumference of the cross key 11.

The Enter key 10 is given as a key requiring a pressing operation. The cross key 11 is given as a key capable of being pressed at up, down, left and right sides respectively. The rotary dial 12 is given as a key capable of being turned clockwise and counterclockwise.

[Electrical Configuration of Mobile Phone System]

Figure 2:
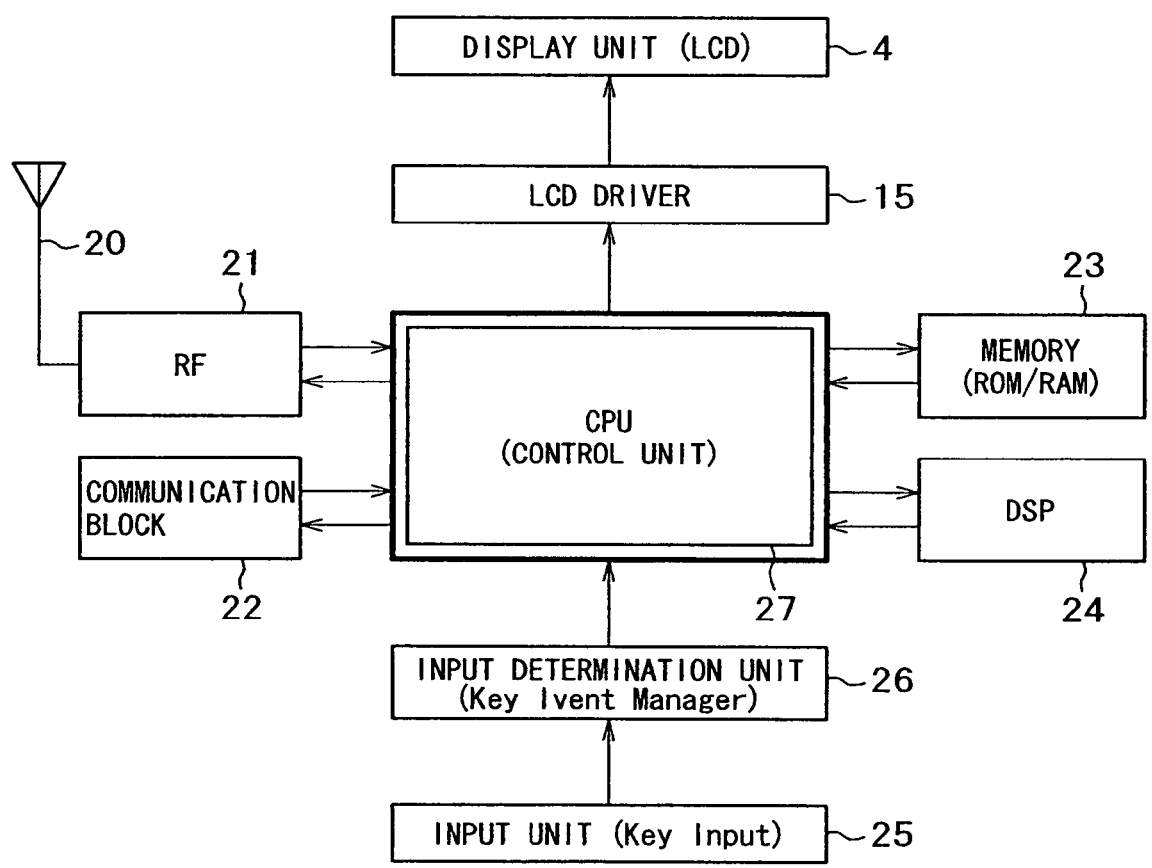
FIG. 2 is a schematic block diagram of the mobile phone system.

FIG. 2 is a schematic block diagram of the above mobile phone system. As seen from FIG. 2, this mobile phone system has an RF block 21 that performs a transmission and a reception of information to and from a radio base station through an antenna 20, a communication block 22 that performs a communication control of the above information, the display unit 4 and a LCD driver 15 that drives the display unit 4 to ensure that prescribed information is displayed.

This mobile phone system also has a memory 23 (ROM/RAM) that permits a storage of programs such as a Web browser and a mobile mail application and also contains information such as a phone directory and an address book of a user, and a DSP 24 (Digital Signal Processor) that performs a high-speed processing etc. applied to the communication control.

This mobile phone system further has an input unit 25 composed of the main operation unit 7 formed with the numeric keypad 6 etc. and the disc jog dial 8, an input determination unit 26 that determines operation contents of the main operation unit 7 and the disc jog dial 8, and a CPU 27 (a control unit) that controls an information processing of the whole mobile phone system.

Further, a display control program (including an addition of visual effects) included in a feature of this mobile phone system and data of a hierarchically structured menu are respectively stored in the memory 23. The CPU 27 operates based on the display control program to control a display with the visual effect added to the hierarchically structured menu in response to an operation of the disc jog dial 8.

[Hierarchical Structure of Menus]

In the case of this mobile phone system, the menu is of a three-layered structure composed of a first hierarchy formed with a menu of high-order items, a second hierarchy formed with a menu of middle-order items and a third hierarchy formed with a menu of low-order items. Information of the menu of each hierarchy is stored in the memory 23 shown in FIG. 2, and is then read out and controlled that the read-out information is displayed on the display unit 4 by the CPU 27 in response to a prescribed display operation.

[First Hierarchy]

The menu of the first hierarchy (the menu of high-order items) is supposed to be displayed with icons suggestive of each of the menus of the middle-order and the low-order items followed by the high-order items.

FIG. 3A shows an instance of a display of the first hierarchy menu displayed with the icons. In FIG. 3A, there is shown the instance, in which five high-order items of a menu in total are displayed, such as:

a menu of "Network Mode (NW Mode)" shown by a globe icon suggestive of a network that is widespread all over the globe, a menu of each "Setting Mode" shown by a toolbox icon suggestive of a repair and a construction, a menu of "Schedule Setting Mode" shown by a calendar icon suggestive of an entry of a schedule and an appointment, a menu of "Phone Setting Mode" shown by a phone receiver icon suggestive of a phone-related setting, and a menu of "Entertainment Mode" shown by a camera apparatus icon suggestive of a video image and a music setting.

As seen from FIG. 3A, these high-order items of the menu are supposed to be displayed on the display unit 4 in an approximately equal spaced arrangement in the shape of ellipse. This states that these high-order items of the menu are linked to each other seamlessly.

Specifically, as described later, in the case of this mobile phone system, a presently selected high-order item of the menu is supposed to be displayed at a central region of the display unit 4 on an enlarged scale with a prescribed magnification. Then, the icon displayed on the enlarged scale at the central region of the display unit 4 is supposed to be sequentially switched in the order of "the globe"→"the toolbox"→"the calendar"→"the phone receiver"→"the camera apparatus"→"the globe"→"the toolbox" . . . , for instance, to perform the display on the enlarged scale, each time the rotary dial 12 of the disc jog dial 8 is turned.

[Second Hierarchy]

While the menu of the first hierarchy is displayed with the icons, the menu of the second hierarchy (the menu of the middle-order items) is supposed to be displayed with characters respectively, as shown in FIG. 3B. It is to be understood that the middle-order items of the menu are imagined to be linked to each other seamlessly in the shape of ellipse (an ellipse concentric with that of the high-order items) so as to surround the menu of the high-order items. Then, the menu of the middle-order items ranges to a large number of items, so that in the case of the display, a part of the whole menu of the middle-order items is supposed to be displayed on the display unit 4, as shown in FIG. 3A.

Incidentally, while this embodiment is supposed to display the part of the whole menu of the middle-order items on the display unit 4, it may be also modified to display the whole menu of the middle-order items on the display unit 4 at a time.

[Third Hierarchy]

The menu of the third hierarchy is supposed to be displayed with characters like the menu of the second hierarchy. While the menus of the first and the second hierarchies are displayed simultaneously on the display unit 4, the menu of the third hierarchy is supposed to be displayed as a separate display as shown in FIG. 3C.

Further, the menu of the third hierarchy is a menu containing a small number of low-order items corresponding to each middle-order item of the menu, and is thus supposed to be displayed in a sequential arrangement ranging from an upper region to a lower region of the display unit 4 as shown in FIG. 3C. Thus, a desired menu is supposed to be selected by an operation of moving a cursor CR by a user.

[Menu Selecting Operation]

Figure 4:
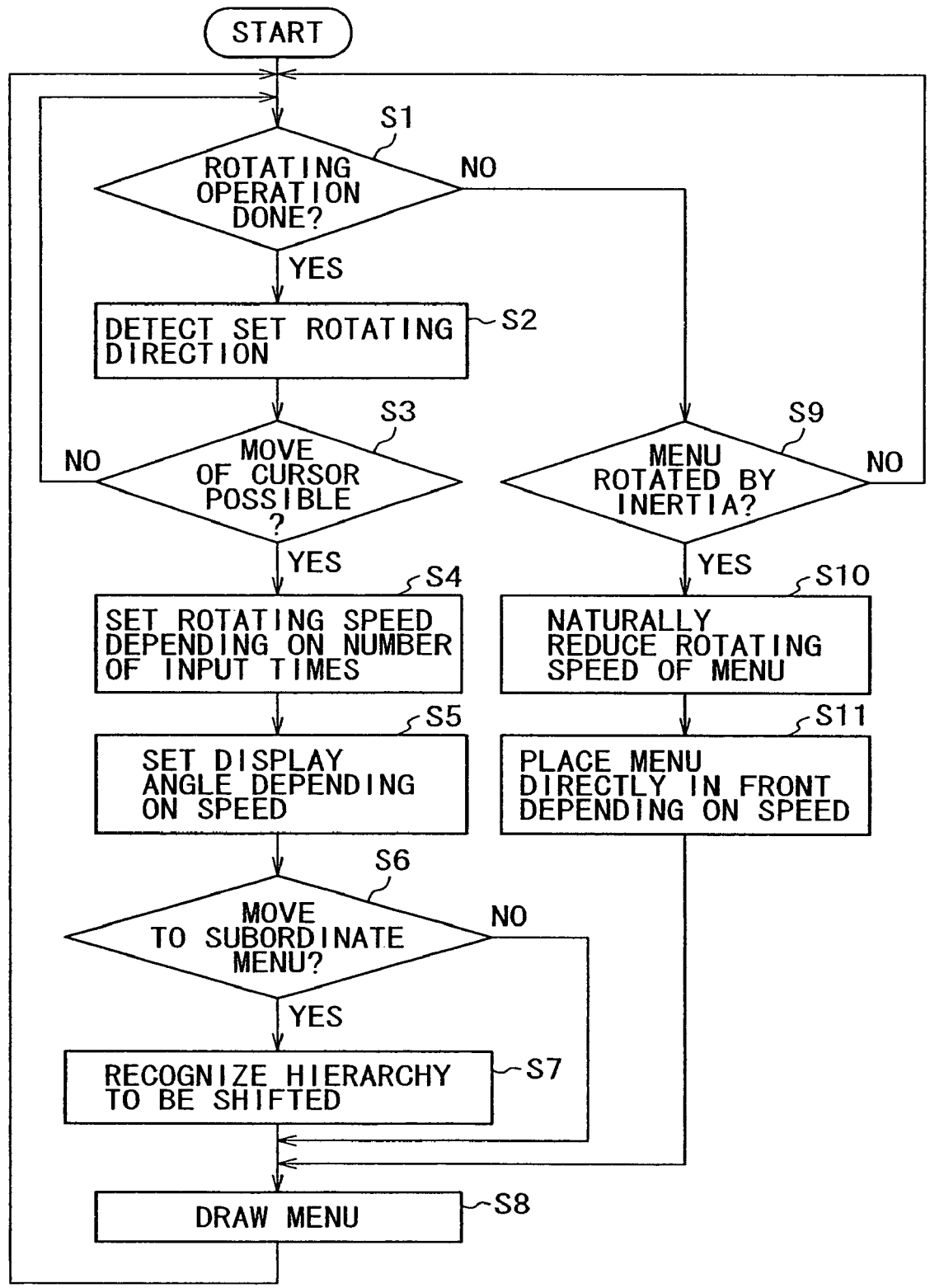
FIG. 4 is a flowchart for illustrating a scrolling control of the menus.

FIG. 4 is a flowchart showing a flow of an operation of selecting the menu having the above hierarchical structure. The flowchart shown in FIG. 4 starts following that the CPU 27 detects a prescribed operation of giving a menu select instruction in a condition where an awaiting display is on the display unit 4. When the prescribed operation of giving the menu select instruction is detected, the CPU 27 controls that each icon of the menu of the first hierarchy is displayed on the enlarged scale with the prescribed magnification and in the elliptical arrangement on the display unit 4, and also that a defaulted menu icon among the above icons is displayed on a further enlarged scale with a prescribed magnification at the approximate center of the display unit 4, as an initial display applied to a menu selection, as shown in FIG. 3A.

FIG. 3A illustrates a case where the defaulted menu is the network mode. In this case, the network mode is defaulted, so that the globe icon corresponding to the network mode comes to be displayed larger than the other icons.

The CPU 27 controls that the icon located at the approximate center of the display unit 4 is displayed larger than the other icons as described above, in which case, the CPU also controls that a name corresponding to the above icon is displayed in characters at a lower region of the above icon, for instance.

Specifically, in the case illustrated in FIG. 3A, characters of "NW Mode (Network Mode)" specified as the name corresponding to the icon located at the approximate center of the display unit 4, that is, the globe icon, come to be displayed at the lower region of the above icon.

Incidentally, while this embodiment is supposed to default the icon displayed on the enlarged scale at the approximate center of the display unit 4, it may be also modified to allow the CPU 27 to store, in the memory 23, information representing the icon having been selected by the previous menu selecting operation, whereby when a next menu select instruction is given, an icon corresponding to the information stored in the memory 23 is displayed on the enlarged scale at the approximate center of the display unit 4.

When the icons of the first hierarchy are displayed as described above, the user selects a desired menu by rotating the rotary dial 12 of the disc jog dial 8 to rotate each of the displayed icons of the first hierarchy until the icon corresponding to the desired menu is displayed on the enlarged scale at the approximate center of the display unit 4.

In Step S1 of the flowchart shown in FIG. 4, the CPU 27 judges whether or not the rotating operation of the rotary dial 12 is carried out. When the rotating operation of the rotary dial 12 is detected (a case of YES), the processing is moved on to Step S2, while no rotating operation of the rotary dial 12 is detected (a case of NO), the processing is moved on to Step S9.

[Setting of Rotating Direction to Direction of Rotating Operation]

A rotational display direction of the menu of each item corresponding to a direction of the rotating operation of the rotary dial 12 is set such that in the default, when the rotary dial 12 is rotated clockwise, for instance, the menu of each item is rotationally displayed clockwise.

However, there is a sensuous difference, depending on users, in the rotational display direction of the menu of each item corresponding to the direction of the operation of the rotary dial 12, like a case where the user desires that the menu of each item be rotationally displayed counterclockwise in a case of the clockwise rotating operation of the rotary dial 12.

Thus, the above mobile phone system is designed to be capable of setting a direction, in which the menu of each item is rotationally displayed, corresponding to the direction of the rotating operation of the rotary dial 12 by the user at will.

This setting is supposed to take place by means of pressing the right soft key 13 and the left soft key 14 shown in FIG. 1. While the following is only one instance, pressing the right soft key 13, for instance, provides the setting in which the menu is rotationally displayed clockwise in a case of the clockwise rotating operation of the rotary dial 12. Also, pressing the left soft key 14 provides the setting in which the menu is rotationally displayed counterclockwise in a case of the counterclockwise rotating operation of the rotary dial 12.

When the right soft key 13 or the left soft key 14 is pressed, the CPU 27 controls that the above setting data is stored in the memory 23 shown in FIG. 2.

The setting data stored in the memory 23 is read out from the memory 23 when the rotating operation of the rotary dial 12 was detected with the CPU 27, as described in the following. Then, the CPU 27 controls, based on the setting data read out from the memory 23, the rotational display direction of the menu of each item corresponding to the direction of the rotating operation of the rotary dial 12.

As described above, this mobile phone system is capable of setting a desired rotational display direction of the menu corresponding to the rotating direction of the rotary dial 12 merely by pressing the right soft key 13 or the left soft key 14, in other words, by one-touch operation. Thus, a menu display matched to a user's feeling of operation and a user's hand more skillful than the other is made possible.

Next, in the Step S2, the CPU 27 reads out the setting data stored in the memory 23 as described above to detect the rotational display direction of the menu of each item corresponding to the direction of the rotating operation of the rotary dial 12. Then, after the detection of the rotational display direction, the processing is moved on to Step S3.

In the Step S3, the CPU 27 judges whether or not an operation of moving the cursor displayed on the display unit 4 is possible.

Specifically, in the case of this mobile phone system, while the menus of the first and the second hierarchies require the rotating operation of the rotary dial 12 to select the desired menu, the menu of the third hierarchy shown in FIG. 3C is supposed to be selected by operating an upper cross key 11U or a lower cross key 11D to move the cursor CR up or down.

Thus, the mobile phone system in this embodiment is incapable of moving the cursor CR with the rotary dial 12 in a case of selecting the menu of the third hierarchy (incidentally, it may be also modified to move the cursor CR with the rotary dial 12 at the time of the selection of the menu of the third hierarchy). Thus, in the Step S3, the CPU 27 judges whether or not a movement of the cursor CR with the rotary dial 12 is possible in the menu of the hierarchy presently being on the display unit 4.

Then, when the movement of the cursor CR with the rotary dial 12 is judged to be possible (=when the menu on the display unit 4 at present is the menu of the first or the second hierarchy=the case of YES), the processing is moved on to Step S4.

On the other hand, when the movement of the cursor CR with the rotary dial 12 is judged to be not possible (=when the menu on the display unit 4 at present is the menu of the third hierarchy=the case of NO), the processing is returned to the Step S1, where a monitoring of the rotating operation of the rotary dial 12 is performed again.

Next, in the Step S4, the CPU 27 determines a rotational display speed based on an amount of the rotating operation of the rotary dial 12 (the number of rotation). While the following is only one instance, the rotary dial 12 has, therein, 36 pieces of click mechanisms in total for each angle of 10 degrees, for instance. This click mechanism is supposed to supply one pulse to the CPU 27 each time the rotary dial 12 is rotated by an angle of 10 degrees.

The CPU 27 determines a rotational display speed of the menu of the first or the second hierarchy based on an interval at which the above pulse is supplied and the number of pulses etc. The CPU 27 also determines the rotational display direction of the menu based on the setting data stored in the memory 23 and representing the above rotational display direction.

[Setting of Display Angle]

Next, in Step S5, the CPU 27 sets a display angle of the menu of the second hierarchy which the CPU 27 controls the rotation display thereof to a display angle suited to the rotational display speed.

FIGS. 5A and 5B illustrate the display of the menu of the second hierarchy in the process of selecting the menu of the first hierarchy. FIG. 5A shows a condition where no rotating operation of the rotary dial 12 takes place at the time of the selection of the menu of the first hierarchy. As seen from FIG. 5A, at the time when the menu of the first hierarchy is selected, the CPU 27 controls that the first hierarchy menu icon located at the approximate center of the display unit 4 is displayed with a magnification larger than that of the other icons of the menu of the first hierarchy.

In this condition, when the rotary dial 12 is rotated as shown in FIG. 5B, the CPU 27 controls that the icons of the menu of the first hierarchy and the characters of the menu of the second hierarchy are rotationally displayed based on the above rotational display speed and the above rotational display direction.

When performing the rotational display control described above, the CPU 27 sets the display angle of the menu of the second hierarchy which the CPU 27 controls the rotational display as well as each menu of the first hierarchy by changing the above display angle appropriately depending on the above rotational display speed. Hereby, rotating the rotary dial 12 in a case of selecting the desired menu of the first hierarchy leads to the rotational display of the menu of the first hierarchy, and also to the control that the menu of the second hierarchy is displayed in a radial manner, as shown in FIG. 5B.

Likewise, FIGS. 6A and 6B illustrate the display of the menu of the second hierarchy in the process of selecting the menu of the second hierarchy. FIG. 6A shows a condition where no rotating operation of the rotary dial 12 takes place at the time of the selection of the menu of the second hierarchy. As seen from FIG. 6A, at the time when the menu of the second hierarchy is selected, the CPU 27 performs the display of each icon of the menu of the first hierarchy on a reduced scale in the form of being put to a left end of the display unit 4, and also the display of each character of the menu of the second hierarchy on the enlarged scale with the prescribed magnification.

In this condition, when the rotating operation of the rotary dial 12 is detected, the CPU 27 controls that each icon of the menu of the first hierarchy and the menu of the second hierarchy are rotationally displayed based on the above rotational display speed and the above rotational display direction, as shown in FIG. 6B.

When performing the rotational display control as described above, the CPU 27 sets the display angle of the menu of the second hierarchy which the CPU 27 controls the display as well as each menu of the first hierarchy by changing the above display angle appropriately depending on the above rotational display speed, as shown in FIG. 6B. Hereby, rotating the rotary dial 12 in the case of selecting the desired menu of the second hierarchy leads to the rotational display of the menu of the first hierarchy and also to the control that the menu of the second hierarchy is displayed in the radial manner, as shown in FIG. 6C.

The following is one instance of a program (ACTION SCRIPT) in the display angle control of the menu of the second hierarchy.

```
//Number of menu items of second hierarchy
disc Menu Item Num = 33;
//Angle of one menu item of second hierarchy
disc Menu Angle = 360/disc Menu Item Num;
//Set menu rotational display speed
D = (360-selected Num * disc Menu Angle) - Menu._rotation;
//Cancel contradiction of rotational display speed
including zero degree
if (D < -180 | | D > 180) {
    D = ((-selected Num * disc Menu Angle + 180)% 360) -
((Menu._rotation + 180)% 360);
}
//Set percentage of speed from rotational display speed
disc Acceleration = Math.abs(D/20);
if (disc Acceleration > 1) {disc Acceleration = 1;}
//Adjust rotational display speed
D=D/2;
//Rotate whole menu
Menu._rotation = (Menu._rotation + D + 360)% 360;
//Set menu angle
for (i = 1; i < = disc Menu Item Num; i ++) {
//Set each menu name
name = String (i);
if (i<10) {
name = string ("0"+i);
}
//Set each menu angle with centrifugal force
rd = ((selected Num + disc Menu Item Num + 1 - i)* disc
Menu Angle +180)%360-180;
Menu [name]._rotation = - Menu._rotation - rd*disc
Acceleration - D;
}
```

Incidentally, "rd" in the above program represents a display angle at the time when the menu is in a radial widened condition. Then, this "rd" is set at a value ranging from 0 to 100% depending on the rotational display speed expressed by disc Acceleration (0 to 100%).

In an actual world, rotating an object causes a centrifugal force to act on the rotated object, and like this, the control of the display angle of the menu of the second hierarchy depending on the rotating operation of the rotary dial 12 allows the user to feel as if the centrifugal force acted on the menu. Thus, the rotating of the object and the centrifugal force as same as those in the actual world allow the user to become accustomed to the menu selecting operation.

Next, when the rotational display speed and the display angle are determined as described above, the CPU 27 judges in Step S6 whether or not an instruction to make transition of the hierarchy of the menu to be selected was given by the user (whether or not an instruction to shift to the sub menu was given). In the case of this mobile phone system, the instruction to make the transition of the hierarchy of the menu to be selected is given by means of pressing the right cross key 11R or the left cross key 11L shown in FIG. 3A.

Specifically, FIG. 3A illustrates the display in the case of the selection of the menu of the first hierarchy, in which case, when the transition of the hierarchy of the menu to be selected to the second hierarchy is desired in this display condition, the user presses the right cross key 11R at the time when the desired icon of the menu of the first hierarchy is displayed on the enlarged scale.

When a pressing operation of the right cross key 11R is detected at the time of the selection of the menu of the first hierarchy, the CPU 27 recognizes the first hierarchy menu having been displayed on the enlarged scale at the approximate center of the display unit 4 to be one selected by the user. Then, the CPU 27 controls that the menu of the first hierarchy is displayed on the reduced scale at a left end region and also that the characters of the second hierarchy menu corresponding to the selected menu of the first hierarchy are displayed on the enlarged scale with the prescribed magnification, as shown in FIG. 3B. The CPU 27 also controls that the cursor CR used for the selection of the desired item from the menu of the second hierarchy is displayed in the case of the display of the menu of the second hierarchy.

Incidentally, the instance shown in FIG. 3B is to illustrate the display of the menu of the second hierarchy in a case where the NW Mode of the first hierarchy is selected, in which case, a menu of "mail" in the NW Mode menu is presently selected with the cursor CR.

Likewise, when the pressing operation of the right cross key 11R is detected at the time of the selection of the menu of the second hierarchy, the CPU 27 recognizes the second hierarchy menu having been displayed at the display position of the cursor CR to be one selected by the user. Then, the CPU 27 controls that the menu of the third hierarchy is displayed on the display unit 4 as shown in FIG. 3C. The CPU 27 also controls that the cursor CR used for the selection of the desired item from the menu of the third hierarchy, as shown in FIG. 3C.

FIG. 3C illustrates an instance of the display in which a menu of "my select setting" is presently selected. While the CPU 27 controls that the menus of the first and the second hierarchies are displayed simultaneously at the time of the selection of the menu of the first hierarchy and also that of the second hierarchy, it is supposed to control that only the menu of third hierarchy is displayed (the menus of other hierarchies are not displayed) at the time of the selection of the menu of the third hierarchy.

Incidentally, this embodiment contains no hierarchy lower than the menu of the third hierarchy, so that in a case of the detection of the pressing operation of the right cross key 11R in the condition where the menu of the third hierarchy is displayed on the display unit 4, the CPU 27 ignores (cancels) the pressing operation of the right cross key 11R (in this case, it may be also modified to return the display to the first hierarchy select display).

While the above description states the embodiment in which the transition of the hierarchy for the selection of the menu from the higher hierarchy to the lower hierarchy is made, it is also allowable to make the transition of the hierarchy for the selection of the menu from the lower hierarchy to the higher hierarchy.

When the pressing operation of the left cross key 11L is detected at the time of the selection of the menu of the third hierarchy shown in FIG. 3C, the CPU 27 recognizes that a retry of the selecting operation was specified. Then, as shown in FIG. 3B, the CPU controls that the menu of the first hierarchy is displayed on the reduced scale at the left end region of the display unit 4 and also that the characters of the second hierarchy menu corresponding to the first hierarchy menu having been selected immediately before the transition to the menu of the third hierarchy are displayed on the display unit 4 on the enlarged scale with the prescribed magnification. The CPU 27 also controls that the cursor CR used for the selection of the desired item from the menu of the second hierarchy is displayed in the case of the display of the menu of the second hierarchy.

Likewise, when the pressing operation of the left cross key 11L is detected at the time of the selection of the menu of the second hierarchy, the CPU 27 controls that the menu of the first hierarchy is displayed on the display unit 4 as shown in FIG. 3A.

Incidentally, this embodiment contains no hierarchy higher than the menu of the first hierarchy, so that in the case where the pressing operation of the left cross key 11L, in the condition where the menu of the first hierarchy is displayed on the display unit 4, is detected, the CPU 27 ignores (cancels) the pressing operation of the left cross key 11L (in this case, it may be also modified to return the display to the third hierarchical select display).

As described above, the above mobile phone system is designed to be capable of making the transition of the hierarchy for the selection of the menu by pressing the right cross key 11R and the left cross key 11L. Thus, in a case where the pressing operation of the right cross key 11R or the left cross key 11L is detected by the CPU 27 in the above Step S6, the CPU 27 recognizes in Step S7 that the menu to be displayed on the display unit 4 was instructed to change to the menu of the lower or higher hierarchy.

In a case of no detection of the pressing operation of the right cross key 11R or the left cross key 11L is not detected in the above Step S6, the CPU 27 recognizes that the menu to be displayed on the display unit 4 is the presently displayed hierarchy menu.

Then, in a case where the pressing operation of the right cross key 11R or the left cross key 11L in the above Step S6 is not detected, the CPU 27 controls in Step S8 that the presently displayed hierarchy menu is rotationally displayed based on the rotational display speed determined in the Step S4 and the display angle determined in the Step S5.

On the other hand, in a case of the detection of the pressing operation of the right cross key 11R or the left cross key 11L in the Step S6, the CPU 27 controls in the Step S8 that the menu of the hierarchy having been specified by the pressing operation of either of the keys 11R and 11L is displayed on the display unit 4.

After the control of the display described above, the CPU 27 returns the processing to the Step S1, and follows the processing ranging from the Step S1 to the Step S8 repeatedly as long as the detection of the rotating operation is kept in the Step S1.

Then, the user stops the rotating operation of the rotary dial 12, when the desired menu of the first hierarchy was displayed on the enlarged scale at the center of the display unit 4, or the desired menu was at the display position of the cursor CR at the time of the selection of the menu of the second hierarchy. Hereby, the rotating operation of the rotary dial 12 is stopped from being detected in the Step S1, and the processing of the CPU 27 comes to be moved from the Step S1 to Step S9.

When no detection of the rotating operation of the rotary dial 12 causes the processing to be moved on to the Step S9, the CPU 27 judges whether or not the rotational display of the menu controlled the display on the display unit 4 is in the process of being kept controlled (whether or not the menu is rotationally displayed by inertia).

Specifically, in the case of this mobile phone system, the CPU 27 controls that the whole menu of the high-order items and the part of the menu of the middle-order items are displayed on the display unit 4 at a time, in which case, however, when the rotating operation of the rotary dial 12 is performed at the time of the selection of the menu of the high-order items, the CPU 27 controls to rotationally display the whole menu of the high-order items and also controls that the menu of the middle-order items is rotationally-displayed so as to be followed by the rotational display of the menu of the high-order items with somewhat delays.

The same is also applied to a case of selecting the menu of the middle-order items, so that when the rotating operation of the rotary dial 12 is performed, the CPU 27 controls to rotationally display the menu of the middle-order items and also controls that the menu of the high-order items is rotationally displayed so as to be followed by the rotational display of the menu of the middle-order items with somewhat delays.

Incidentally, while in this embodiment, when the menu of the first hierarchy (the menu of the high-order items) is rotationally displayed, the menu of the second hierarchy (the menu of the middle-order items) is rotationally displayed following the rotational display of the menu of the first hierarchy, and on the other hand, when the menu of the second hierarchy is rotationally displayed, the menu of the first hierarchy is rotationally displayed following the rotational display of the menu of the second hierarchy, it may be also modified to rotationally display only the rotationally displayed hierarchy menu so as to rotationally display only the menu of the first hierarchy when the menu of the first hierarchy is rotationally displayed, and to rotationally display only the menu of the second hierarchy when the menu of the second hierarchy is rotationally displayed.

The CPU 27 controls that the menu of each item is rotationally displayed as described above, in which case, it also controls that the menu of each item controlled the rotational display is stopped with some delay (several m sec) from the time at which the rotating operation of the rotary dial 12 is stopped from being detected. Thus, even when no rotating operation of the rotary dial 12 takes place (immediately after the stop of the rotating operation of the rotary dial 12), the menu of each item displayed on the display unit 4 is often placed in the rotational display condition. In the Step S9, the CPU 27 judges whether or not the menu is in the condition where it is rotationally displayed by inertia.

Then, when it is judged in the Step S9 that no rotational display of the menu by inertia takes place, the CPU 27 returns the processing to the Step S1, where the monitoring of the presence or not of the rotating operation of the rotary dial 12 is restarted.

On the other hand, when it is judged in the Step S9 that the menu is being rotationally displayed by inertia, the CPU 27 moves the processing on to Step S10.

The Step S10 is a step that needs to be reached in the condition where when the user stops the rotating operation of the rotary dial 12, the rotational display of the menu of each item by inertia is controlled immediately after the stop of the rotating operation. When the processing is moved on to the Step S10, the CPU 27 controls the display of the menu so as to gradually reduce the rotational display speed of the menu being rotated by inertia, and then moves the processing on to Step S11.

Then, in the Step S11, the CPU 27 restores, depending on the gradually reduced rotational display speed, the display angle of the menu of the second hierarchy gradually to the display angle (0 degree in this case=a position placed right in front) obtained before the start of the rotation. Then, in the Step S8, the CPU controls that the menu of the second hierarchy (and the icons of the menu of the first hierarchy) is displayed on the display unit 4 with the display angle set at 0 degree.

Specifically, in the process of selecting the first hierarchy, the rotational display of the menu of the first hierarchy is controlled depending on the rotating operation of the rotary dial 12 as shown in FIG. 5B, and the rotational display of the menu of the second hierarchy is also controlled at the display angle suited to the rotational display speed, in which case, the CPU 27 controls that the rotational display speed of the menu of each hierarchy is gradually reduced at the time when the stop of the rotating operation of the rotary dial 12 is detected, and also controls the display angle of the menu of the second hierarchy such that the display angle of the menu of the second hierarchy also gradually approach 0 degree. Then, the display of the menu of the second hierarchy is controlled with the display angle of the menu of the second hierarchy set at 0 degree as shown in FIG. 5C at the time when the rotation of each menu is controlled to stop.

Likewise, in the process of selecting the second hierarchy, the rotational display of each icon of the menu of the first hierarchy is controlled in a manner of being displayed on a reduced scale depending on the rotating operation of the rotary dial 12 as shown in FIG. 6B, and the rotational display of the menu of the second hierarchy is also controlled at the display angle suited to the rotational display speed in a manner of being displayed on an enlarged scale, in which case, the CPU 27 controls that the rotational display speed of the menu of each hierarchy is gradually reduced at the time when the stop of the rotating operation of the rotary dial 12 is detected, and also controls the display angle of the menu of the second hierarchy such that the display angle of the menu of the second hierarchy gradually approaches 0 degree. Then, the display of the menu of the second hierarchy is controlled with the display angle of the menu of the second hierarchy set at 0 degree at the time when the rotation of each menu is controlled to stop as shown in FIG. 6C.

[Change of Display Color]

At the time of the selection of the menu of the first hierarchy, each icon of the menu of the first hierarchy is controlled in the manner of being displayed on the enlarged scale on the display unit 4, and the menu of the second hierarchy is also controlled in the manner of being displayed on the reduced scale in the image of surrounding the icons of the menu of the first hierarchy, as shown in FIGS. 5A and 5B.

The menu of the second hierarchy is controlled such that the second hierarchy menu item corresponding to the menu of the first hierarchy in the process of being selected, that is, the menu displayed on the enlarged scale at the approximate center of the display unit 4, is displayed in character color different from that of the other items of the menu of the second hierarchy.

Specifically, FIG. 5A illustrates an instance in which the icon of the Network Mode (NW Mode) given by the image of the globe is controlled in a manner of being displayed at the approximately center of the display unit 4, in which case, the CPU 27 controls that each character of "NW Mode Menu", "Mail", "Application" and "NW mode Lock" contained in the menu of the second hierarchy corresponding to the NW Mode is displayed in display color different from that of the other items of the menu of the second hierarchy.

Likewise, FIG. 5B illustrates an instance in which the icon of the Setting Mode given by the image of the toolbox is controlled in a manner of being displayed at the approximate center of the display unit 4, in which case, the CPU 27 controls that each character of "Initialization", "Sound Setting", "Display Setting", "Manner Mode Setting", "Call-in/Call-out", "Packet Communication" and "Security" contained in the menu of the second hierarchy corresponding to the Setting Mode is displayed in display color different from that of the other items of the menu of the second hierarchy.

The control to display each menu of the first and the second hierarchies on the display unit 4 at a time and the control to display, in the character color different from that of the other items of the menu of the second hierarchy, the character color (the display color) of the menu of the second hierarchy corresponding to the menu of the first hierarchy in the process of being selected are performed as described above, whereby the menu of the second hierarchy placed lower than the menu of the first hierarchy in the process of being presently selected may be displayed for the user in such a manner as to discriminate against the other items of the menu of the second hierarchy, before the transition to the selection of the menu of the second hierarchy (=in the process of selecting the menu of the first hierarchy). Thus, it is possible to give assistance in selecting the menu of the first hierarchy by the user.

[Sub Menu Rotational Display Following Rotation of Main Menu]

When the rotating operation of the rotary dial 12 is performed at the time of the selection of the menu of the first hierarchy, the CPU 27 controls that the icons of the menu of the first hierarchy are rotationally displayed in response to the rotating operation, and also that the menu of the second hierarchy is rotationally displayed so as to follow the rotational display of the icons of the menu of the first hierarchy with some delays.

Likewise, when the rotating operation of the rotary dial 12 is performed at the time of the selection of the menu of the second hierarchy, the CPU 27 also controls that the menu of the second hierarchy is rotationally displayed in response to the rotating operation, and also that the menu of the first hierarchy is rotationally displayed so as to follow the rotational display of the icons of the menu of the second hierarchy with some delays.

Specifically, at the time of the selection of the menu of the first hierarchy, the menu of the first hierarchy is specified as the main menu, while the menu of the second hierarchy is specified as the sub menu, so that the CPU 27 controls the rotational display of the menu of each hierarchy such that the rotation of the menu of the second hierarchy follows the rotation of the menu of the first hierarchy.

Further, at the time of the selection of the menu of the second hierarchy, the menu of the second hierarchy is specified as the main menu, while the menu of the first hierarchy is specified as the sub menu, so that the CPU 27 controls the rotational display of the menu of each hierarchy such that the rotation of the menu of the first hierarchy follows the rotation of the menu of the second hierarchy.

Figure 7:
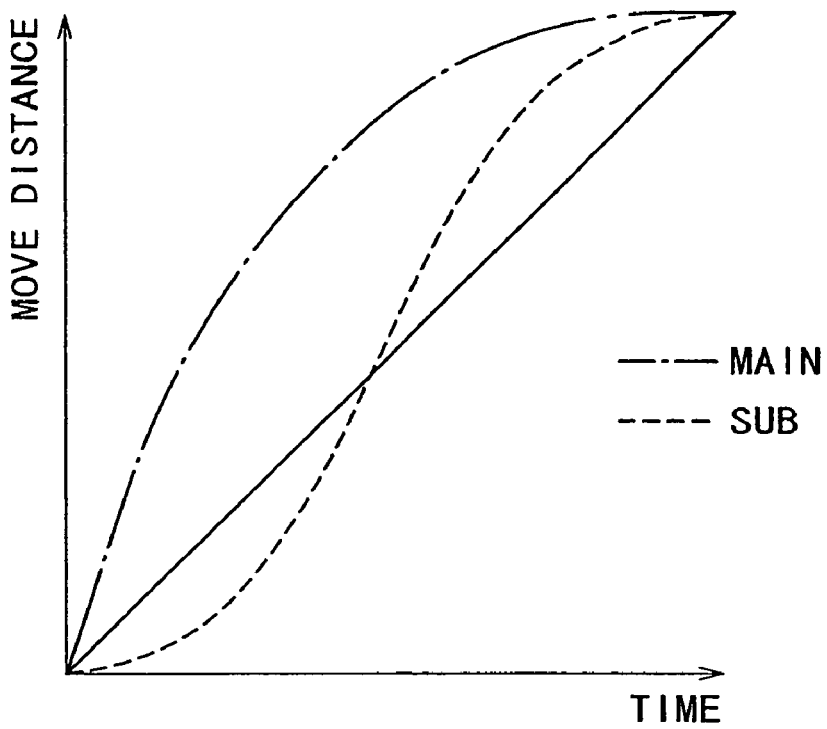
FIG. 7 is a view for illustrating a scrolling action of a sub menu scrolled following a scroll of a scrolled main menu.

FIG. 7 shows a relation between the main menu and the sub menu in the rotational display control. In FIG. 7, a time base is scaled at a horizontal axis, while a menu moving distance is scaled at a vertical axis. A graph indicated by a straight line is that obtained in a case where the rotational display speed of the main menu is set equal to that of the sub menu. In this case, the rotational display speed of the main menu is the same as that of the sub menu, so that a graph is obtained in the shape of a linearly extending graph, while in the case of this mobile phone system, the CPU 27 controls the rotational display speed of the main menu and the sub menu as described in the following.

Specifically, when controlling the rotational display of the main menu, the CPU 27 controls that the main menu is rotationally displayed so as to describe a parabola such that until the rotational display speed of the main menu reaches the maximum, an, increase of the rotational display speed is attained in an approximately linear shape, and after the rotational display speed of the main menu reaches the maximum, the maximum rotational display speed is maintained, as shown by a chain line in FIG. 7.

Specifically, when the moving distance of the main menu is assumed to be "d1($t$)", the CPU 27 controls the display of the main menu so as to attain the moving distance "d1($t$)" calculated by an operation expression:

$$d1(t)=t+(1/\pi)\sin(\pi t)$$

On the other hand, when controlling the rotational display of the sub menu, the CPU 27 firstly controls that the sub menu is rotationally displayed at a low speed and then that the sub menu is rotationally displayed so as to describe a curve such that since the lapse of a prescribed period of time, an increase of the rotational display speed is attained in the approximately linear shape, and after the rotational display speed of the sub menu reaches the maximum, the maximum rotational display speed is maintained, as shown by a dotted line in FIG. 7.

Specifically, when a moving distance of the sub menu is assumed to be "d2($t$)", the CPU 27 controls the display of the sub menu so as to attain the moving distance "d2($t$)" calculated by an operation expression:

$$d2(t)=t-(½)\sin(2t)$$

Assuming that an object A and an object B are connected together through a rubber member to move the object A along the circumference of a prescribed circle, for instance, only the object A is moved up to a certain distance due to a tensile force of the rubber member, an object B's own weight and a frictional force etc. However, when a distance of the movement of the object A exceeds the above certain distance, the object B starts moving gradually. Then, when the distance of the movement of the object A largely exceeds the above certain distance, the object B is moved in such a manner as to be followed by the movement of the object A.

The relation between the main menu and the sub menu in the rotational display control as described with reference to FIG. 7 has resemblance to the relation between the objects A and B connected together through the rubber member. Specifically, when controlling the rotational display of the sub menu, the CPU 27 controls the rotational display of the sub menu such that the sub menu starts rotating slightly later than the rotation of the main menu to ensure that the rotation of the sub menu at the same rotational display speed as the main menu is attained since the lapse of the prescribed period of time.

In other words, the CPU 27 firstly starts the rotational display control of the menu of the hierarchy (=the main menu) in the process of being selected, and then controls that the menu of the other hierarchy (=the sub menu) corresponding to the menu of the hierarchy in the process of being selected is rotated so as to follow the rotation of the menu of the hierarchy in the process of being selected.

Hereby, the menu of the hierarchy in the process of being selected starts the rotate firstly, so that it is possible to allow the user to recognize easily the menu of the hierarchy in the process of being selected, even when the menus of the two hierarchies, that is, the first and the second hierarchies are displayed simultaneously on the display unit 4.

[Scrollbar Suited to Seamless Arrangement of Menu of Second Hierarchy]

Normally, in the menu, a menu item placed at the head (a starting end) and a menu item placed at the tail (a terminating end) are prescribed. Thus, an installation of a scrollbar that moves in accordance with the cursor movement given by the user permits the user to recognize that the cursor is at which position in the whole menu by referring to the scrollbar.

However, in the case of this mobile phone system, the menu of the second hierarchy is in a seamless connected arrangement as described above, so that the menu items termed the starting end and terminating end menu items are not present, resulting in a disadvantage of being difficult to grasp the present cursor position in the whole menu.

Thus, the CPU 27 of the above mobile phone system controls that a scrollbar 30 permitting a current cursor position to be grasped is displayed along the left end of the display unit 4, as shown in FIGS. 3A and 3B, in a case of the display of the menu of the second hierarchy.

Figure 8:
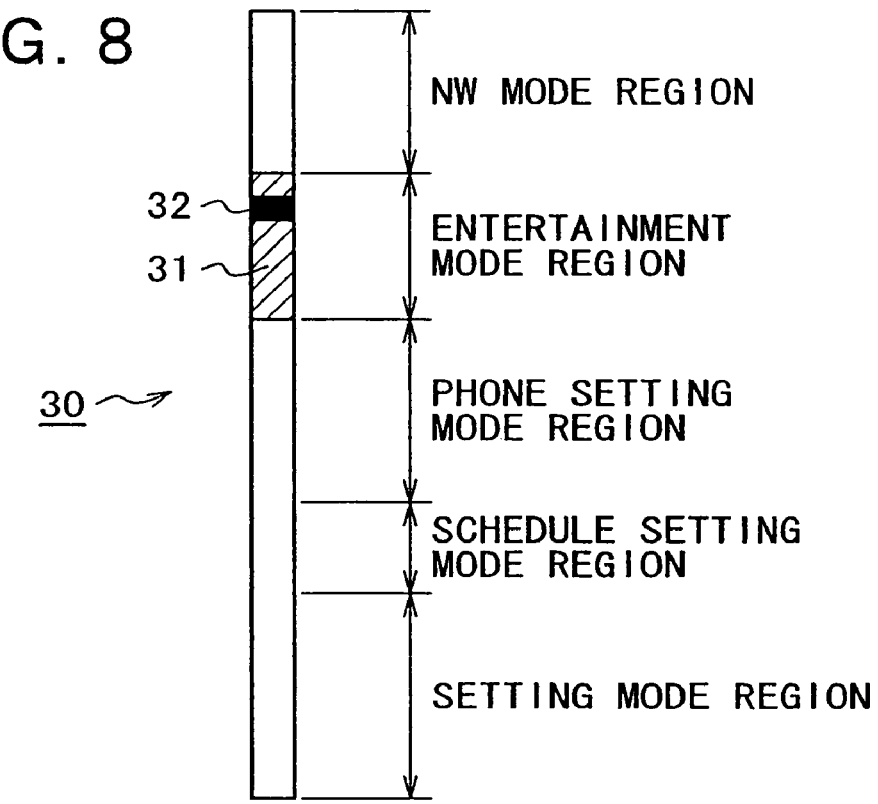
FIG. 8 is a schematic view of a scrollbar displayed on a display unit at the time of a selection of the menu.

FIG. 8 is a schematic view showing the scrollbar 30. The whole of this scrollbar 30 is divided correspondingly to the number of items of the menu of the first hierarchy. In the case of this embodiment, the items of the menu of the first hierarchy are five in number, so that the whole of the scrollbar is divided into five regions. Then, the items of the menu of the first hierarchy are assigned to the regions from the uppermost region so as to provide the regions such as "NW Mode region", "Entertainment region", "Phone Setting Mode region", "Schedule Setting Mode region", and "Setting Mode region", etc.

A height of each region is determined depending on the number of items of the menu of the second hierarchy corresponding to the menu of the first hierarchy. When the number of items of the menu of the second hierarchy corresponding to the phone setting mode is more than that of items of the menu of the second hierarchy corresponding to the schedule setting mode, as shown in FIG. 8, for instance, the height of the phone setting mode region becomes longer than that of the schedule setting mode region.

The CPU 27 controls that a first cursor 31 (a cursor shown by slants in FIG. 8) is moved to and displayed at any of the regions corresponding to the first hierarchy menu displayed on the enlarged scale at the center of the display unit 4 in response to the turning operation of the rotary dial 12.

Incidentally, the height of each region is determined depending on the number of items of the menu of the second hierarchy as described above. Thus, a height of the first cursor 31 also comes to change with the height assigned to the region (=the number of items of the menu of the second hierarchy).

Then, the display of a second cursor 32 on the first cursor 31 is supposed to be controlled. The second cursor 32 is supposed to be controlled in a manner of being displayed at a position corresponding to the menu in the process of being currently selected, in the whole menu of the second hierarchy corresponding to the selected menu of the first hierarchy.

In a case where it is assumed that the menu of the entertainment mode is selected from the menu of the first hierarchy, for instance, the cursor 31 is displayed at the region corresponding to the entertainment mode, as shown in FIG. 8. The menu of the second hierarchy corresponding to the entertainment mode contains eight menu items in total, such as "My Select", "Camera", "My Picture", "Music Panel", "Melody Folder", "Barcode Recognition", "External Camera" and "Apparatus Information", for instance. Then, in a case where the menu of the "Camera" is at the position of the cursor CR, since the menu of the "camera" is supposed to be the second menu item among the eight menu items, the CPU 27 divides the first cursor 31 into eight regions and then controls that the second cursor 32 is displayed at the second region among the eight regions.

Specifically, this scrollbar 30 is supposed to be of a so-called double cursor structure having the first cursor 31 controlled so as to be moved and displayed on the scrollbar 30 correspondingly to the selected menu of the first hierarchy, and the second cursor 32 controlled so as to be moved and displayed on the first cursor 31 corresponding to the selected menu of the second hierarchy.

The CPU 27 controls that the first cursor 31 is moved to and displayed at the region corresponding to the first hierarchy menu selected by the user. The height of the first cursor 31 corresponds to the number of items of the menu of the second hierarchy corresponding to the selected menu of the first hierarchy. Thus, the CPU 27 controls that the second cursor 32 is moved to and displayed at the position on the first cursor 31 corresponding to the menu placed at the position of the cursor CR among all the items of the menu of the second hierarchy corresponding to the selected menu of the first hierarchy.

Hereby, at the time of the selection of the first hierarchy, the first cursor 31 is controlled with the CPU 27 in the manner of being moved and displayed on the scrollbar 30 as shown in FIGS. 3A and 3B. Further, at the time of the selection of the second hierarchy, the second cursor 32 is controlled with the CPU 27 in the manner of being moved and displayed on the first cursor 31 as shown in FIGS. 6A and 6B.

The following is one instance of a program (ACTION SCRIPT) in the display control of the cursors 31 and 32.

```
//Set height per one menu item
Item Height = Scrollbar Height/Menu Item Num;
//Set height and position of first cursor 31
Group Focus._y = Selected Group Num * Item Height;
Group Focus._height = Item Height * Group Item Num Array
[Selected Group Num];
//Set height and position of second cursor within first
cursor 31
Cursor Focus._y = Selected Item Num * Item Height;
Cursor Focus._y = Item Height;
```

Figure 9:
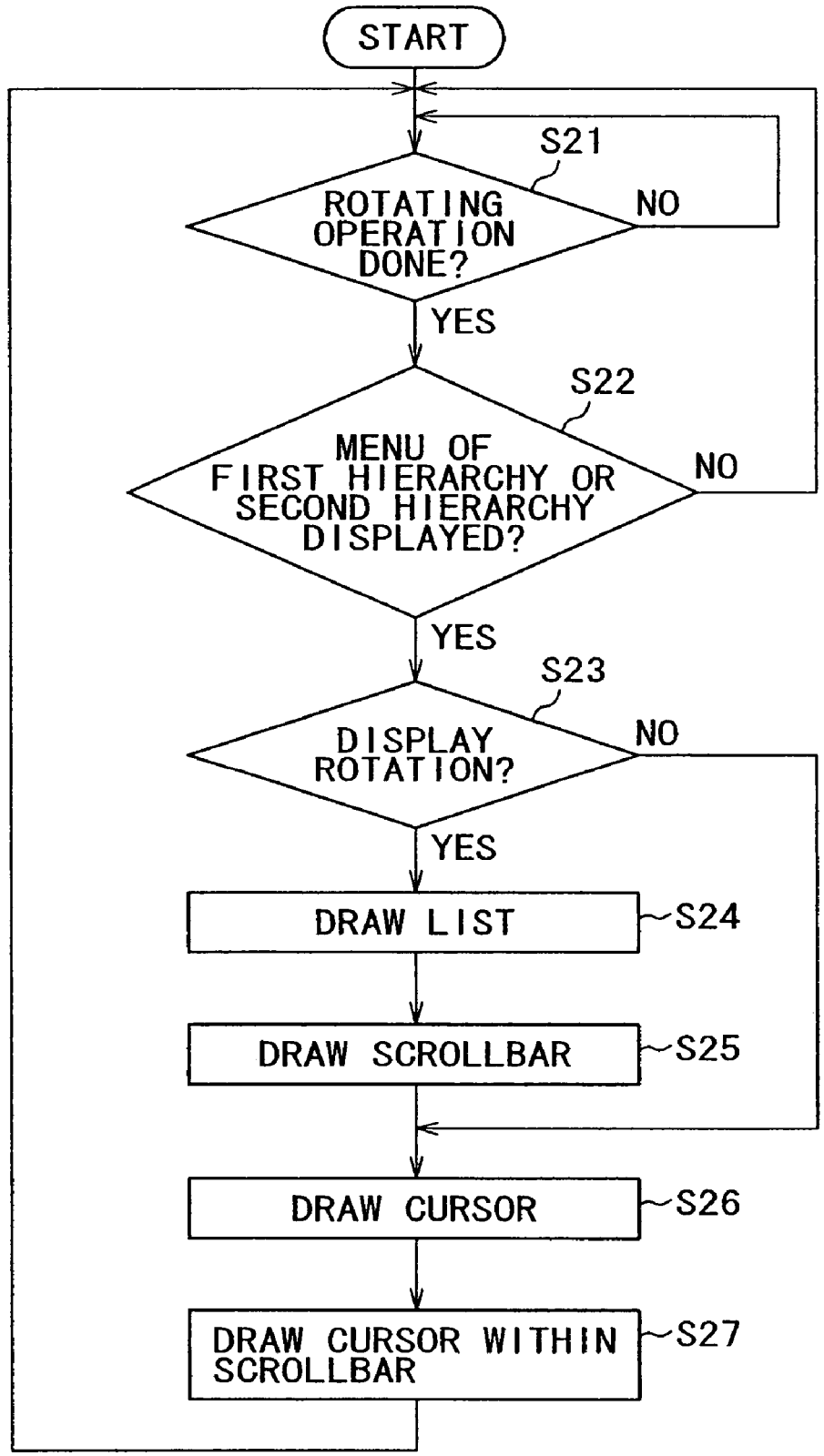
FIG. 9 is a flowchart for illustrating a flow of a processing of drawing the scrollbar.

FIG. 9 shows a flowchart of the display control of the cursors 31 and 32 based on the above program. In the flowchart shown in FIG. 9, whether or not the rotating operation of the rotary dial 21 is carried out is judged in Step S21 with the CPU 27 by monitoring the rotating operation of the rotary dial 21.

Then, the scrollbar 30 is to display the positional relation between the presently selected menus of the first and the second hierarchies. Thus, when the rotating operation of the rotary dial 21 is detected, the CPU 27 judges in Step S22 whether or not the menu of the first or the second hierarchy is displayed at present on the display unit 4.

Incidentally, in a case where it is judged with the CPU 27 in the Step S22 that the menu of the third hierarchy is being displayed, the CPU 27 returns the processing to the Step S21, where the monitoring of the rotating operation of the rotary dial 12 is followed.

Next, in Step S23, it is judged whether or not the display is now in the process of being scrolled (whether or not the menu is in the condition where it is rotationally displayed by inertia due to the rotational display control). In a case where the display is in the process of being scrolled (the case of YES), the CPU 27 performs, in Step S24, a processing of continuously drawing, on the display unit 4, the menu in the process of being controlled the rotational display, and also performs, in Step S25, a processing of drawing the scrollbar 30 on the display unit 4.

Next, the CPU 27 performs, in Step S26, a processing of drawing the first cursor 31, and then, in Step S27, a processing of drawing the second cursor 32 within the first cursor 31.

Hereby, as shown in FIG. 8, a range (displayed with the first cursor 31) of the menu of the second hierarchy corresponding to the selected first hierarchy at which the cursor CR is placed at present, in the whole menu of the second hierarchy in the seamless connected arrangement, and the menu of the second hierarchy (displayed with the second cursor 32) at which the cursor CR is placed at present, in the menu of the second hierarchy corresponding to the above first hierarchy come to be displayed.

[Modification of Scrollbar]

Figure 10:
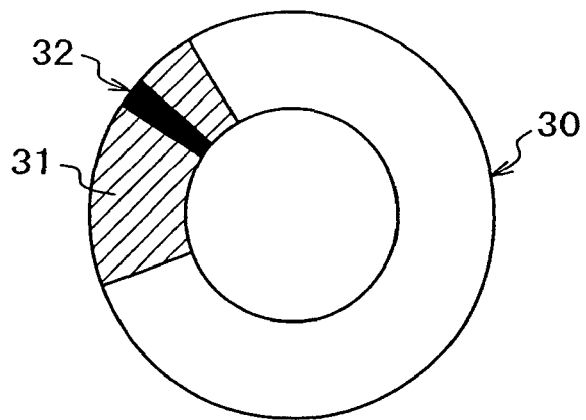
FIG. 10 is a schematic view of a modification of the scrollbar.

While the above embodiment is supposed to display the bar-shaped scrollbar 30 including the cursors ranging to the second cursor 32 at the right end region of the display unit 4, it may be also modified to display a ring-shaped scrollbar 30 including the cursors ranging to the second cursor 32 so as to allow the user to image the menu of the second hierarchy in the seamless connected arrangement as shown in FIG. 10.

In this case, the first cursor 31 is also controlled in the manner of being displayed at the region corresponding to the menu of the first hierarchy having been selected or in the process of being selected, and the second cursor 32 is also controlled in the manner of being displayed at the region corresponding to the menu of the second hierarchy having been selected or in the process of being selected, as described above.

In the above embodiment, the scrollbar 30 including the cursors ranging to the second cursor 32 is applied to the menu in the seamless connected arrangement, like the menu of the second hierarchy, or alternatively, it is also allowable to apply the scrollbar 30 including the cursors ranging to the second cursor 32 to a menu containing items that are too many to be displayed on the display at a time, although the starting end and the terminating end menu items are determined.

In this case, a large number of menu items are contained even when the menu items corresponding to the starting end and the terminating end menu items are determined, it is not possible to display the menu on the display at a time. Thus, the user finds difficulty in recognizing that the menu item presently displayed on the display is which part of the whole menu. In this case, the application of the scrollbar 30 including the cursors ranging to the second cursor 32 allows the user to easily recognize that the menu item presently displayed on the display is which part of the whole menu.

[Addition of Visual Effect to Selected Menu]

This mobile phone system is designed to perform the display control with a prescribed visual effect added to the menu having been selected or in the process of being selected. While the following is only one instance, the visual effect includes four kinds of visual effects in total, that is, "Cosmos (Universe)", "Air (Wind)", "Liquid (Water)" and "Fire (Flame)". A visual effect of "petals", for instance, among these visual effects is set as a default visual effect.

Drawing information of each visual effect and a drawing processing program are stored in the memory 23 shown in FIG. 2. The CPU 27 controls that the menu containing each visual effect is displayed based on the drawing processing program and the drawing information stored in the memory 23.

The user may also selectively set a desired visual effect. When the user selects the desired visual effect, the CPU 27 controls that information representing the selected visual effect is stored in the memory 23 shown in FIG. 2. In the following processing, the CPU 27 controls that the menu is displayed by adding the visual effect corresponding to the information stored in the memory 23, when controlling the display of the menu.

[Visual Effect of Cosmos]

Figure 11:
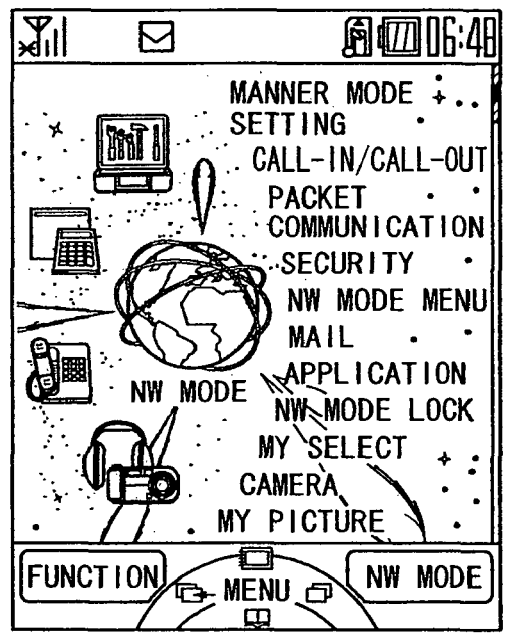
FIG. 11 is a view showing an instance of a display given with a visual effect of the "Cosmos" added to the menu of the first hierarchy.

FIG. 11 illustrates an instance of the display of the menu given with the visual effect of Cosmos (Universe) added. In FIG. 11, there is shown the instance of the display, in which the visual effect of Cosmos is added to the menu of the Network Mode (NW mode) of the first hierarchy.

As described above, the menu of the first hierarchy is sequentially rotationally displayed in response to the rotating operation of the rotary dial 12. Each menu is displayed on an enlarged scale with a prescribed magnification when reaching the approximately central region of the display unit 4, in which case, the CPU 27 controls the display by adding, to the menu displayed on the enlarged scale, a visual effect of a moving image, in which innumerable shooting stars (fireballs) are being shot out in all directions from the icon of the above menu displayed on the enlarged scale.

As described later, a speed of the movement of this shooting star is supposed to vary with a speed of the rotating operation of the rotary dial 12 (=the rotational display speed of the menu). Thus, rotating the rotary dial 12 at high speed allows an image in which the shooting stars are being shot out at high speed in all directions from the menu located at an approximately central region of the display unit 4 to be displayed on the display unit 4.

[Visual Effect of Air]

Figure 12:
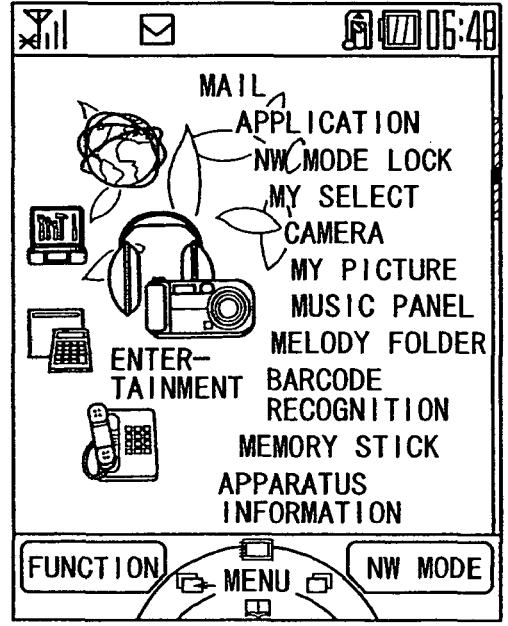
FIG. 12 is a view showing an instance of a display given with a visual effect of "Air" added to the menu of the first hierarchy.

FIG. 12 illustrates an instance of the display in which the visual effect of Air (Wind) is added to the menu of the Entertainment Mode of the first hierarchy.

In this case, the CPU 27 controls that innumerable petals are displayed on the display of the display unit 4, and also controls the display by adding, to the menu displayed on the enlarged scale, the visual effect of a moving image in which the innumerable petals are fluttering about in the air.

As described later, a moving speed of the petals is supposed to vary with the speed of the rotating operation of the rotary dial 12 (=the rotational display speed of the menus). Thus, rotating the rotary dial 12 at high speed allows an image in which the petals within the display unit 4 are fluttering about at high speed to be displayed.

[Visual Effect of Liquid]

Figure 13:
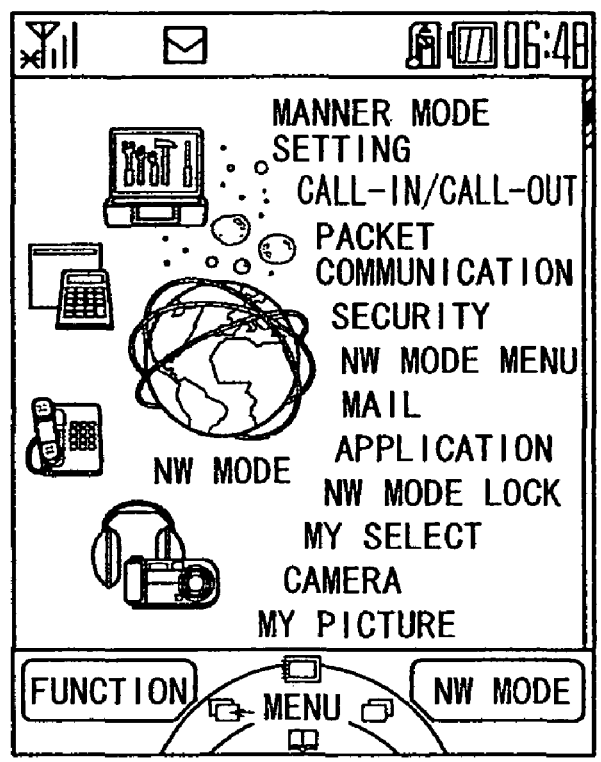
FIG. 13 is a view showing an instance of a display given with a visual effect of "Liquid" added to the menu of the first hierarchy.

FIG. 13 illustrates an instance of the display in which the visual effect of Liquid (Water) is added to the menu of the NW Mode of the first hierarchy.

In this case, the CPU 27 controls that the icon of the menu of the NW Mode is displayed by adding, to the menu of the NW Mode, the visual effect of a moving image, in which innumerable bubbles are ascending upwards.

As described later, the number of bubbles and an ascending speed thereof are supposed to vary with the speed of the rotating operation of the rotary dial 12 (=the rotational display speed of the menus). Thus, rotating the rotary dial 12 at high speed allows an image in which the bubbles are increased in number and are ascending at high speed to be displayed.

[Visual Effect of Fire]

Figure 14:
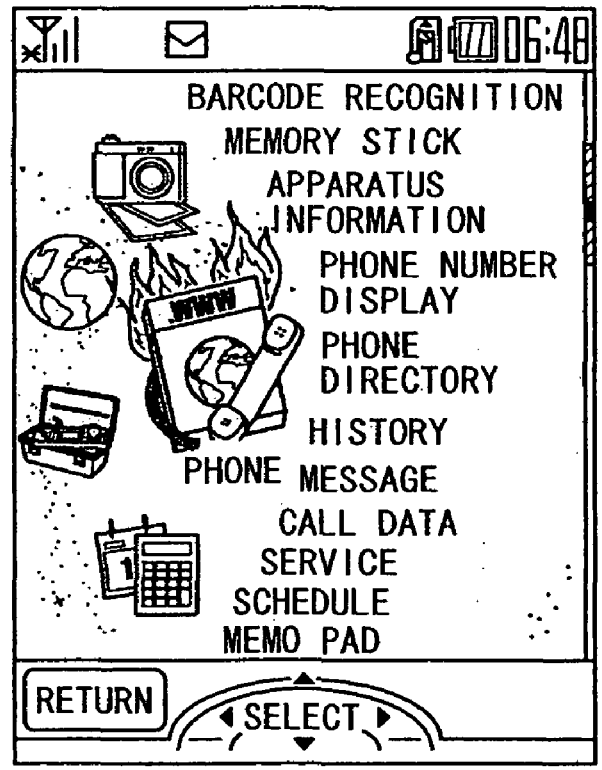
FIG. 14 is a view showing an instance of a display given with a visual effect of "Fire" added to the menu of the first hierarchy.

FIG. 14 illustrates an instance of the display in which the visual effect of Fire (Flame) is added to the menu of the Phone Setting Mode of the first hierarchy.

In this case, the CPU 27 controls that the icon of the menu of the Phone Setting Mode is displayed by adding, to the menu of the Phone Setting Mode, the visual effect of a moving image in which fires are rising upwards.

As described later, a size of fires and a rising speed thereof are supposed to vary with the speed of the rotating operation of the rotary dial 12 (=the rotational display speed of the menus). Thus, rotating the rotary dial 12 at high speed allows an image in which the fires are increased in size and are rising at high speed to be displayed.

[Display Example of Visual Effect Added to Menu of Second Hierarchy]

While the above description states the instance of the display in a case of the addition of the visual effect to the menu of the first hierarchy, the defaulted or the user-selected visual effect is also added at the time of the selection of the menu of the second hierarchy.

Figure 15A:
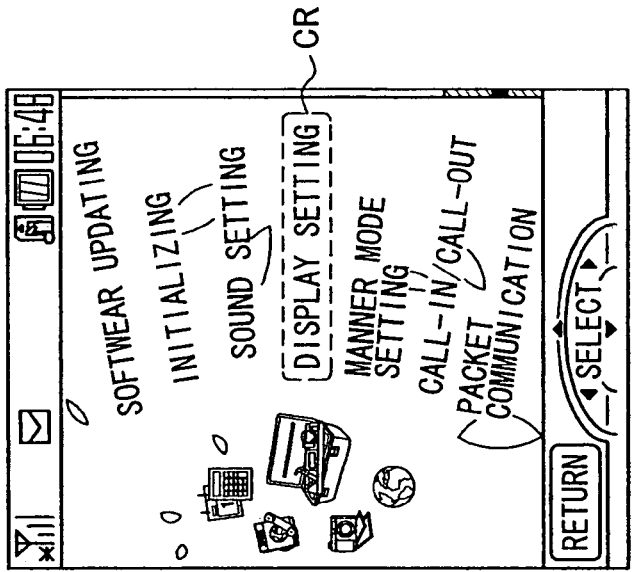
FIG. 15 is a view showing a relation between a volume of visual effect added and a scroll speed in the case where an addition of the visual effect of "Air" to the menu of the second hierarchy is done.
Figure 15B:
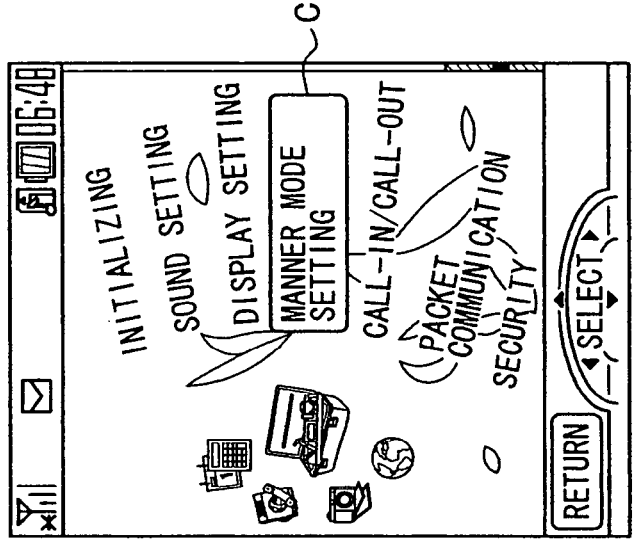
Figure 15C:
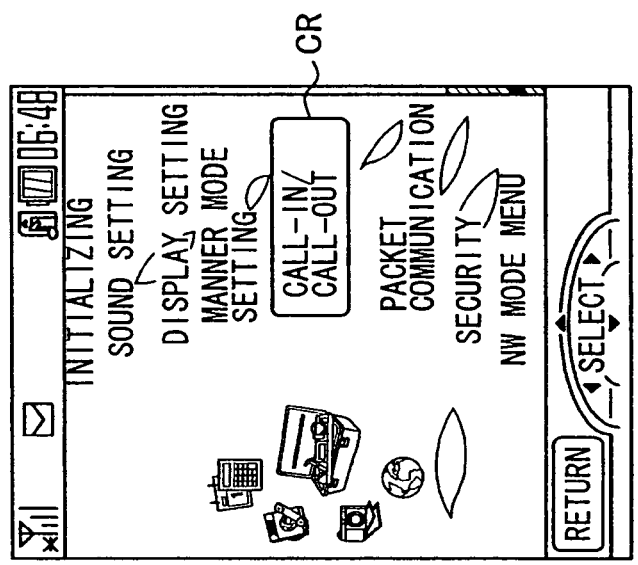

FIGS. 15A to 15C illustrate an instance of the display given with the visual effect of the above "Air (Wind)" added at the time of the selection of the menu of the second hierarchy. FIG. 15A illustrates an instance of the display of the visual effect of "Air" in a condition where no rotating operation of the rotary dial 12 takes place. FIG. 15B illustrates an instance of the display of the visual effect of "Air" in a condition where the rotary dial 12 is rotated at low speed. FIG. 15C illustrates an instance of the display of the visual effect of "Air" in a condition where the rotary dial 12 is rotated at high speed.

Specifically, in the condition where no turning operation of the rotary dial 12 takes place, a so-called windless state is supposed to be imaged. Thus, the CPU 27 performs a processing of drawing an image of petals, which appear from a prescribed portion of the display unit 4 and then fall fluttering downward on the display unit, as shown in FIG. 15A.

When the rotary dial 12 is rotated at low speed, a breeze blowing state is supposed to be imaged. Thus, the CPU 27 performs a processing of drawing an image of petals, which are gently fluttering about on the display unit 4 as shown in FIG. 15B. Then, when the rotary dial 12 is rotated at high speed, a strong-wind blowing state is supposed to be imaged. Thus, the CPU 27 performs a processing of drawing an image of petals, which are violently fluttering about on the display unit 4 as shown in FIG. 15C.

The same processing as the above visual effect drawing processing is also applied to the other visual effects ("Cosmos" and "Liquid", etc.), and the addition of the visual effect is performed at the time of the selection of the menu of the second hierarchy with the amount and the speed varied depending on the turning operation of the rotary dial 12.

[Control of Transparency of Cursor CR Depending on Rotational Display Speed]

The CPU 27 is supposed to control the transparency when displaying the cursor CR depending on the rotational display speed of the menu.

Specifically, the CPU 27 controls that the cursor CR is displayed clearly as shown in FIG. 15A at the time when no rotating operation of the rotary dial 12 takes place, and also controls the display of the cursor CR such that when the rotary dial 12 is rotated so that the rotational display speed of the menu is increased as shown in FIG. 15B, the transparency of the cursor CR is increased gradually depending on the rotational display speed to ensure that an approximately semi-transparent cursor is obtained as shown in FIG. 15C at the time of a high-speed rotation.

Hereby, it is possible to produce a feeling of speediness in rotating the menu. Further, the cursor CR is displayed semi-transparently, so that an enhanced visibility of the menu at the time of the high-speed rotation of the menu may be attained.

[Display of Visual Effect Added to Menu of Third Hierarchy]

Likewise, the defaulted or user-selected visual effect is also added at the time of the selection of the menu of the third hierarchy.

FIGS. 16A to 16C illustrate an instance of the display given with each of the above visual effects added at the time of the selection of the menu of the third hierarchy. FIG. 16A illustrates an instance of the display of the menu of the third hierarchy given with the above visual effect of "Air" added. FIG. 16B illustrates an instance of the display of the menu of the third hierarchy given with the above visual effect of "Fire" added. FIG. 16C illustrates an instance of the display of the menu of the third hierarchy given with the above visual effect of "Liquid" added.

The addition of the visual effect at the time of the display of the menu of the third hierarchy is the same as that at the time of the display of the menus of the other hierarchies. In the case of "Air", for instance, the CPU 27 is supposed to control that the number of fluttering petals and the fluttering speed vary depending on the amount and the speed of the rotating operation of the rotary dial 12, as shown in FIG. 16A.

In the case of "fire", the CPU 27 is also supposed to control that the size of rising fires and the rising speed vary depending on the amount and the speed of the rotating operation of the rotary dial 12, as shown in FIG. 16B.

In the case of "liquid", the CPU 27 is further supposed to control that the number of ascending bubbles and the ascending speed vary depending on the amount and the speed of the rotating operation of the rotary dial 12, as shown in FIG. 16C.

[Flow of Addition of Visual Effect]

FIG. 17 shows a flow required until the above visual effect is added.

Firstly, the CPU 27 judges in Step S31 whether or not the rotating operation of the rotary dial 12 is carried out. In a case where the rotating operation of the rotary dial 12 is detected, the processing is moved on to Step S32, while in a case where no rotating operation of the rotary dial 12 is detected, the processing is moved on to Step S36.

In the case of this embodiment, the menu of the third hierarchy is supposed that the scroll of the menu is stopped at the starting end and the terminating end. Thus, in the Step S32, the CPU 27 judges whether or not the scroll of the menu is possible in response to the rotating operation of the rotary dial 12. Then, when the scroll of the menu is judged to be not possible, the processing is returned to the Step S31, where the monitoring of the rotating operation of the rotary dial 12 follows.

In a case where the scroll of the menu is judged to be possible, the CPU 27 moves the processing on to Step S33, and controls in the Step S33 that the menu of either hierarchy is displayed on the display unit 4 as described above in response to the rotating operation of the rotary dial 12.

Then, in Step S34, the visual effect corresponding to the position, the speed and the moving direction of the menu is created, and in Step S35, the processing of drawing the visual effect is performed.

On the other hand, in a case where no rotating operation of the rotary dial 12 is detected in the Step S31, the CPU 27 judges in Step S36 whether or not a time equal to or more than a prescribed time (10 seconds, for instance) has elapsed from the time when the rotating operation of the rotary dial 12 was stopped from being detected.

Specifically, the CPU 27 starts timing with a timer at the time when the rotating operation of the rotary dial 12 was stopped from being detected. Then, the CPU 27 performs the processing of drawing with the visual effect added in the Step S35, and detection of the presence or not of the rotating operation of the rotary dial 12 in the step S31 till the lapse of 10 seconds, for instance, from the start of the timing, and then moves the processing on to Step S37 at the time when 10 seconds elapsed from the start of the timing.

In Step S37, the CPU 27 gradually reduces the volume of effect such that the volume of effect comes to zero in 15 seconds, for instance, and then performs the processing of drawing the visual effect based on the reduced volume of effect in Step S35.

[Flow of Addition of Visual Effect of "Cosmos"]

Figure 18:
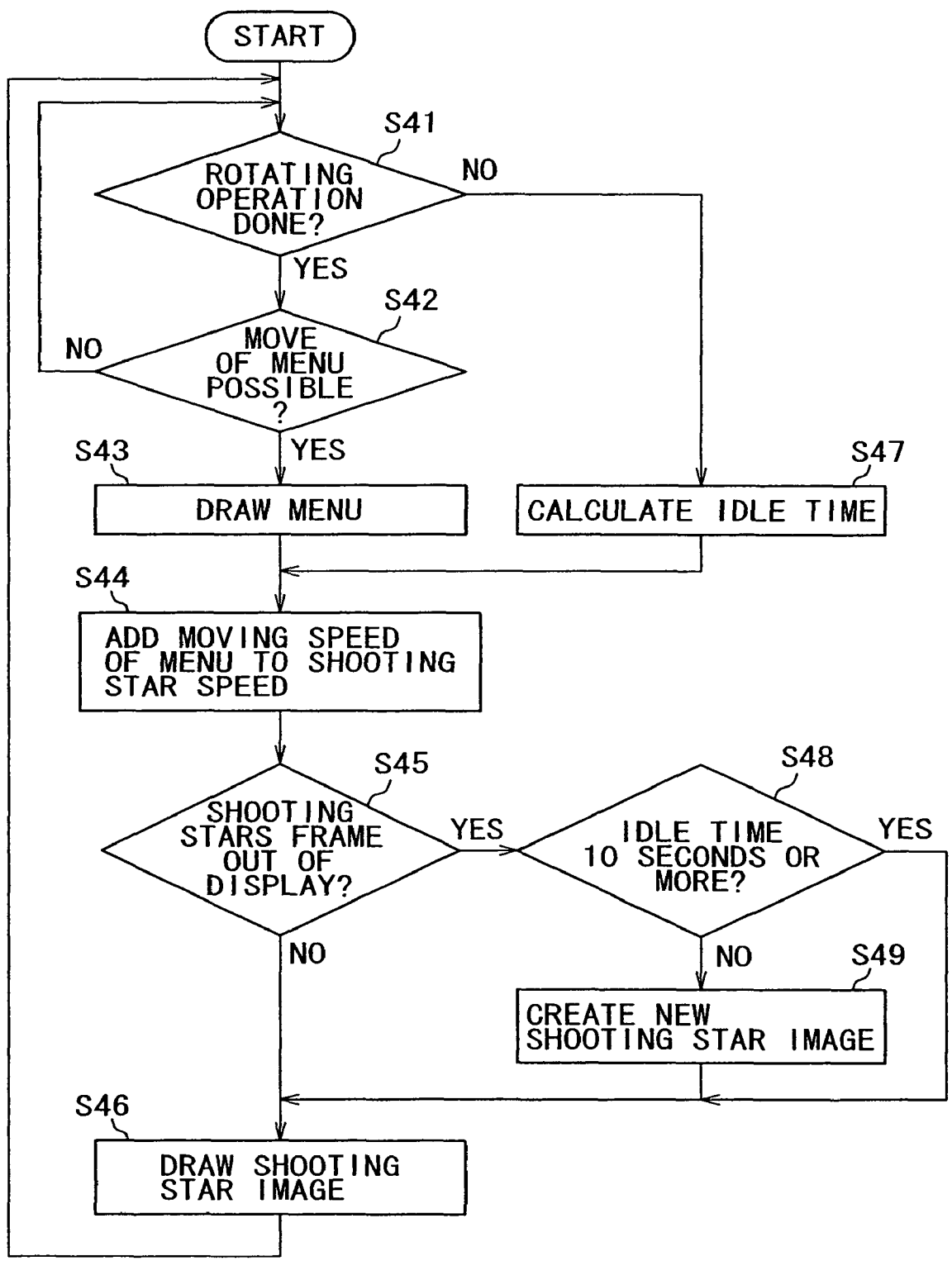
FIG. 18 is a flowchart for illustrating a flow required until the visual effect of "Cosmos" is added to the menu.

Next, FIG. 18 shows a flow required until the processing of drawing the visual effect of "Cosmos" is performed.

Firstly, the CPU 27 judges in Step S41 whether or not the rotating operation of the rotary dial 12 is carried out. In a case where the rotating operation of the rotary dial 12 is detected, the processing is moved on to Step S42, while in a case where no rotating operation of the rotary dial 12 is detected, the processing is moved on to Step S47.

In the case of this embodiment, the menu of the third hierarchy is supposed that the scroll of the menu is stopped at the starting end and terminating end. Thus, in the Step S42, the CPU 27 judges whether or not the scroll of the menu is possible depending on the rotating operation of the rotary dial 12. Then, in a case where the scroll of the menu is judged to be not possible, the processing is returned to the Step S41, where the monitoring of the rotating operation of the rotary dial 12 follows.

In a case where the scroll of the menu is judged to be possible, the CPU 27 moves the processing on to Step S43, then, in the Step S43, controls that the menu of either hierarchy is displayed on the display unit 4 as described above in response to the rotating operation of the rotary dial 12, and moves the processing on to Step S44.

On the other hand, in a case where no rotating operation of the rotary dial 12 is detected in the Step S41, the CPU 27 detects (calculates), in Step S47, a time (an idle time) that has elapsed from the time when the rotating operation was stopped from being detected, and then moves the processing on to Step S44.

In the Step S44, the CPU 27 performs the processing of drawing an image of the shooting stars having the speed corresponding to the moving speed of the menu, and then moves the processing on to Step S45. Hereby, the image of the shooting stars that are shot out in all directions from the menu located at the approximately central region of the display unit 4 and have the moving speed varied with the speed of the rotating operation of the rotary dial 12 (=the rotational display speed of the menu) comes to be displayed on the display unit 4 as shown in FIG. 11.

The CPU 27 keeps monitoring the display position of each shooting star which the CPU 27 controls the movement and the display as described above, and then detects the presence or not of the shooting stars supposed to be outside a display range of the display unit 4 (detects framed-out shooting stars). Then, in a case where the framed-out shooting stars are detected, the processing is moved on to Step S48, while when no framed-out shooting star is detected, the processing is moved on to Step S46.

In a case where no framed-out shooting star is detected, the CPU 27 performs, in the Step S46, the processing of drawing the image of shooting stars continuously depending on the rotating operation speed of the rotary dial 12 detected in the Step S44.

On the other hand, when the framed-out shooting stars are detected, the CPU 27 judges in Step S48 whether or not the idle time having been detected in the Step S47 reaches equal to or more than 10 seconds.

In a case where the idle time is less than 10 seconds, the time has not elapsed so much from the time when the rotating operation of the rotary dial 12 was stopped from being detected. Thus, the CPU 27 creates an image of new shooting stars in place of the framed-out shooting stars in the Step S49, and then performs the processing of drawing the image of the new shooting stars in the Step S46. Specifically, the CPU 27 is supposed to control that an image of a fixed number of shooting stars such as 10 shooting stars, for instance, is displayed on the display unit 4 in advance, so that the processing of drawing is performed in such a manner as to make up for the framed-out shooting stars. Hereby, the image of the fixed number of shooting stars comes to be drawn at all times on the display unit 4.

Herein, the processing of drawing the image of the fixed number of shooting stars at all times is performed only in the case where the idle time is less than 10 seconds. When the lapse of the idle time equal to or more than 10 seconds is detected in the Step S48, the CPU 27 continues to perform the processing of drawing the image of the shooting stars existing on the display in the Step S46 without drawing the image of the shooting stars taking the place of the framed-out shooting stars. Hereby, the shooting stars displayed on the display unit 4 come to be gradually framed out from the time when the turning operation of the rotary dial 12 was stopped from being detected.

[Flow of Addition of Visual Effect of "Air"]

Figure 19:
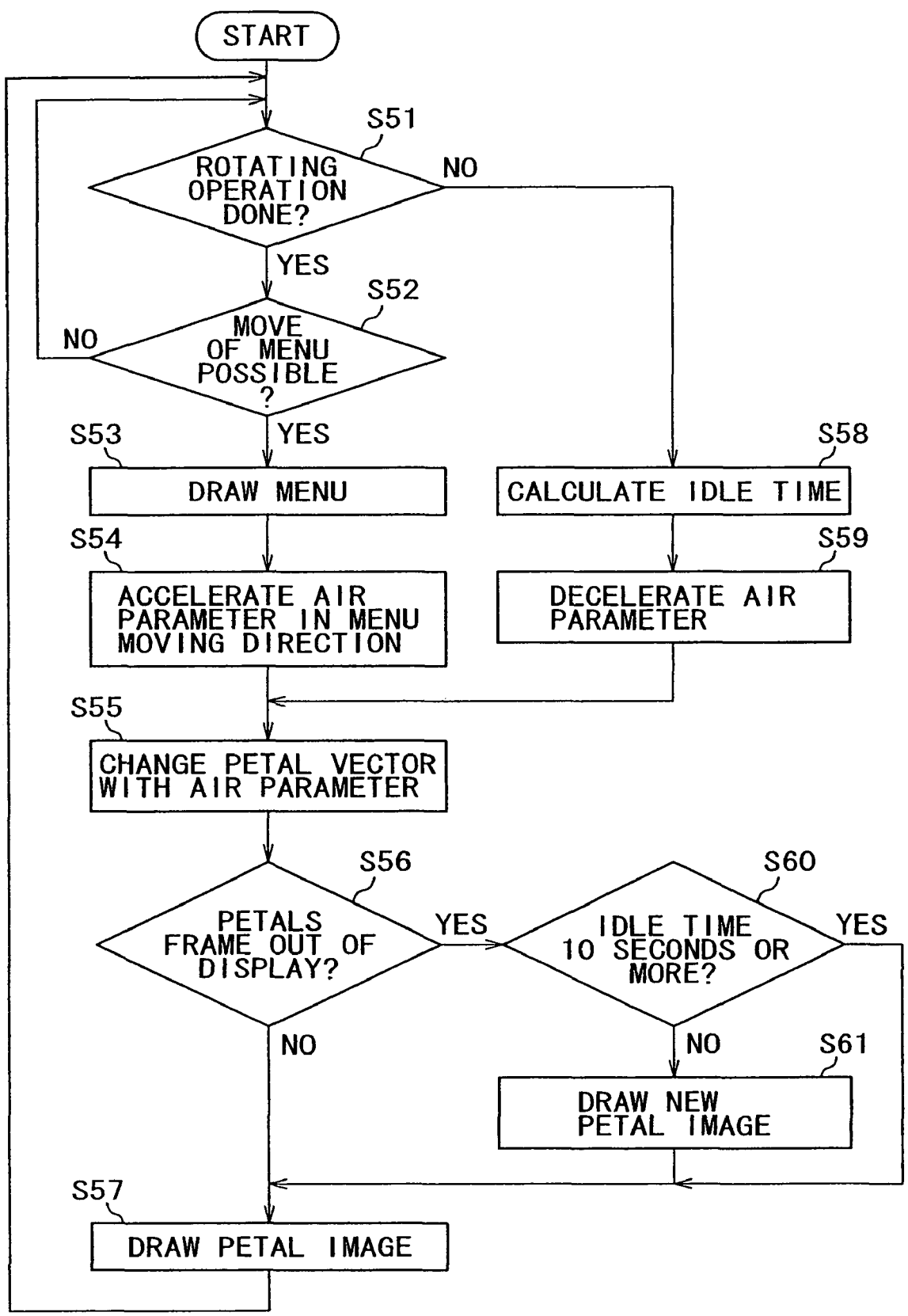
FIG. 19 is a flowchart for illustrating a flow required until the visual effect of "Air" is added to the menu.

FIG. 19 shows a flow required until the processing of drawing an image of the visual effect of "Air" is performed.

Firstly, the CPU 27 judges in Step S41 whether or not the rotating operation of the rotary dial 12 is carried out. In a case where the rotating operation of the rotary dial 12 is detected, the CPU 27 moves the processing on to Step S52, while in a case where no rotating operation is detected, the CPU 28 moves the processing on to Step S58.

As described above, in the case of this embodiment, the menu of the third hierarchy is supposed that the scroll of the menu is stopped at the starting end and terminating end. Thus, in the Step S52, the CPU 27 judges whether or not the scroll of the menu is possible in response to the rotating operation of the rotary dial 12. Then, in a case where the scroll of the menu is judged to be not possible, the processing is returned to the Step S51, where the monitoring of the rotating operation of the rotary dial 12 follows.

In a case where the scroll of the menu is judged to be possible, the CPU 27 moves the processing to Step S53. In the Step S53, the CPU 27 controls that the menu of either hierarchy is displayed on the display unit 3 as described above in response to the rotating operation of the rotary dial 12, and then moves the processing on to Step S54.

In the Step S54, the CPU 27 sets a numerical value of an air parameter on the moving direction of the menu so as to be incremented (sets the air parameter so as to be accelerated). In Step S55, the CPU 27 changes, based on the air parameter set in the Step S54, a vector value of each petal controlled the display on the display unit 4. Then, in the Step S57, the processing of drawing the image of the petals fluttering about in the air on the display unit 4 is performed based on the changed vector value. Hereby, the image of the petals fluttering about on the display unit 4 in the air of velocity suited to the rotating operation of the rotary dial 12 comes to be drawn.

On the other hand, in a case where no rotating operation of the rotary dial 12 is detected in the step S51, the CPU 27 detects (calculates), in Step S58, a time (an idle time) that has elapsed from the time when the rotating operation was stopped from being detected, and then moves the processing on to Step S59.

In the Step S59, the rotating operation of the rotary dial 12 has been stopped from being detected, so that the CPU 28 sets the numerical value of the air parameter so as to be decremented (sets the air parameter so as to be decelerated). Then, in the Step S55, the CPU 27 changes, based on the air parameter set in the Step S59, the vector value of each petal controlled the display on the display unit 4. Then, in the Step S57, the processing of drawing the image of the petals fluttering about in the air on the display unit 4 is performed based on the changed vector value. Hereby, the image of the petals fluttering about in the gradually softened air comes to be drawn.

Next, the CPU 27 keeps monitoring the display position of each petal controlled the display as described above, and in Step the S56, detects the presence or not of the petals supposed to be outside the display range of the display unit 4 (detects framed-out petals). Then, in a case where the framed-out petals are detected, the processing is moved on to Step S60, while in a case where no framed-out petal is detected, the processing is moved on to Step S57.

In a case where no framed-out petal is detected, the CPU 27 continues to perform, in the Step S57, the processing of drawing the image of each petal based on the vector value set in the Step S55.

On the other hand, when the framed-out petals are detected, the CPU 27 judges in Step S60 whether or not the idle time having been detected in the Step S55 reaches equal to or more than 10 seconds.

In a case where the idle time is less than 10 seconds, the time has not elapsed so much since the rotating operation of the rotary dial 12 was stopped from being detected. Thus, the CPU 27 creates an image of new petals in place of the framed-out petals in Step S61, and performs the processing of drawing the image of the petals in Step S67. Specifically, the CPU 27 is supposed to control that an image of a fixed number of petals such as 20 pieces of petals, for instance, is displayed on the display unit 4 in advance, so that the drawing processing is performed in such a manner as to make up for the framed-out petals. Hereby, the image of the fixed number of petals comes to be always drawn on the display unit 4.

The processing of drawing the image of the fixed number of petals at all times is performed only when the idle time is less than 10 seconds. When the lapse of the idle time equal to or more than 10 seconds is detected in the Step S60, the CPU 28 continues to perform the processing of drawing the image of the petals existing on the display in the Step S57 without drawing the image of the petals in place of the framed-out petals. Hereby, the petals displayed on the display unit 4 come to be gradually framed out from the time when the turning operation of the rotary dial 12 was stopped from being detected.

[Flow of Addition of Visual Effect of "Fire"]

Figure 20:
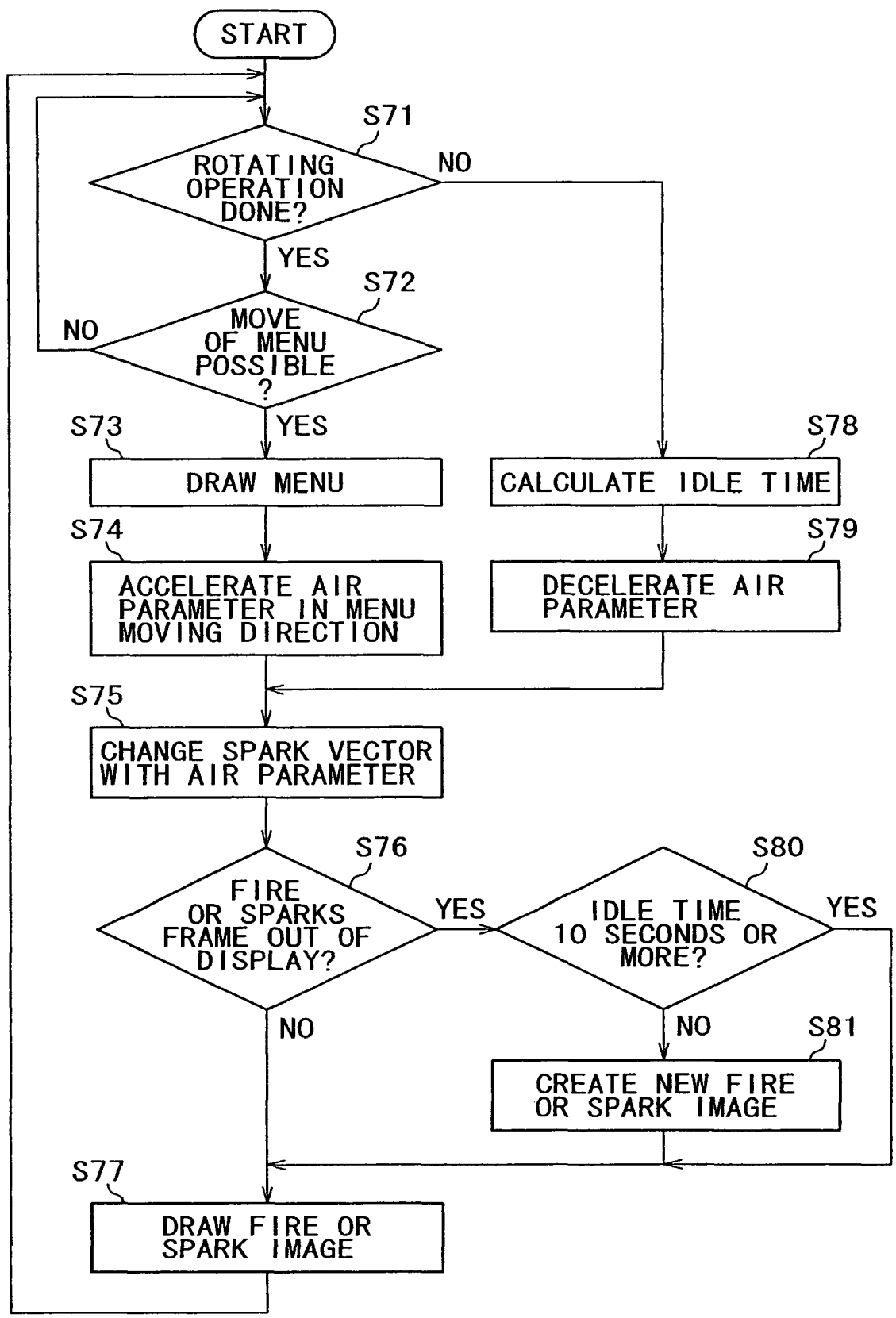
FIG. 20 is a flowchart for illustrating a flow required until the visual effect of "Fire" is added to the menu.

FIG. 20 shows a flow required until the processing of drawing an image of the visual effect of "Fire" is performed.

Firstly, the CPU 27 judges in Step S71 whether or not the rotating operation of the rotary dial 12 is carried out. In a case where the rotating operation of the rotary dial 12 is detected, the processing is moved on to Step S72, while in a case where no rotating operation of the rotary dial 12 is detected, the processing is moved on to Step S78.

As described above, in the case of this embodiment, the menu of the third hierarchy is supposed that the scroll of the menu is stopped at the starting end and terminating end. Thus, in Step S72, the CPU 27 judges whether or not the scroll of the menu is possible in response to the rotating operation of the rotary dial 12. Then, when the scroll of the menu is judged to be not possible, the processing is returned to the Step S'1, where the monitoring of the rotating operation of the rotary dial 12 follows.

In a case where the scroll of the menu is judged to be possible, the CPU 27 moves the processing on to Step S73, then, in the step S73, controls that the menu of either hierarchy is displayed on the display unit 4 as described above in response to the rotating operation of the rotary dial 12, and then moves the processing on to Step S74.

In the Step S74, the CPU 27 sets the numerical value of the air parameter on the moving direction of the menu so as to be incremented (sets the air parameter so as to be accelerated). In Step S75, the CPU 27 changes, based on the air parameter set in the Step S74, a vector value of sparks controlled the display on the display unit 4. Then, in the Step S77, the processing of drawing an image of fires rising upwards by the wind on the display unit 4 is performed based on the changed vector value. Hereby, the image of the fires rising by the wind of velocity suited to the rotating operation of the rotary dial 12 comes to be drawn on the display unit 4.

On the other hand, in a case where no rotating operation of the rotary dial 12 is detected in the Step S71, the CPU 27 detects (calculates), in Step S78, the time (the idle time) that has elapsed from the time when the rotating operation was stopped from being detected, and then moves the processing on to Step S79.

In the Step S79, the rotating operation of the rotary dial 12 has been stopped from being detected so that the CPU 27 sets the numerical value of the air parameter so as to be decremented (sets the air parameter so as to be decelerated). Then, in the Step S75, the CPU 27 changes, based on the air parameter set in the Step S79, the vector value of the fires controlled the display on the display unit 4. Then, in the Step S77, the processing of drawing the image of the fires rising by the wind on the display unit 4 is performed based on the varied vector value. Hereby, the image of the fires rising gently by the gradually softened wind comes to be drawn on the display unit 4.

Next, the CPU 27 keeps monitoring the display position of the fires or sparks controlled the display as described above, and in Step S76, detects the presence of not of the fires or sparks supposed to be outside the display range of the display unit 4 (detects framed-out fires or sparks). Then, in a case where the framed-out fires or sparks are detected, the processing is moved on to Step S90, while in a case where no framed-out fire or spark is detected, the processing is moved on to Step S77.

In the case where no framed-out fire or spark is detected, the CPU 27 continues to perform, in Step S77, the processing of drawing an image of the existing fires or sparks based on the vector value set in the Step S75.

On the other hand, in the case where the framed-out fires or sparks are detected, the CPU 27 judges in Step S80 whether or not the idle time having been detected in the Step S78 reaches equal to or more than 10 seconds.

In a case where the idle time is less than 10 seconds, the time has not elapsed so much from the time when the rotating operation of the rotary dial 12 was stopped from being detected. Thus, the CPU 27 creates a new image of fires or sparks in place of the framed-out fires or sparks, and then performs the processing of drawing the image of the fires or sparks in Step S77. Specifically, the CPU 27 is supposed to control that an image of a fixed number of fires or sparks is displayed on the display unit 4, so that the processing of drawing is performed in such a manner as to make up for the framed-out fires or sparks. Hereby, the image of the fixed number of fires or sparks comes to be drawn at all times on the display unit 4.

The processing of drawing the image of the fixed number of fires or sparks at all times is performed only in the case where the idle time is less than 10 seconds. When the lapse of the idle time equal to or more than 10 seconds is detected in the Step S80, the CPU 27 continues to perform the processing of drawing the image of fires or sparks existing on the display in the Step S77 without drawing the image of the fires or sparks in place of the framed-out fires or sparks. Hereby, the fires or sparks displayed on the display unit 4 come to be gradually reduced from the time when the rotating operation of the rotary dial 12 was stopped from being detected.

[Flow of Addition of Visual Effect of "Liquid"]

Figure 21:
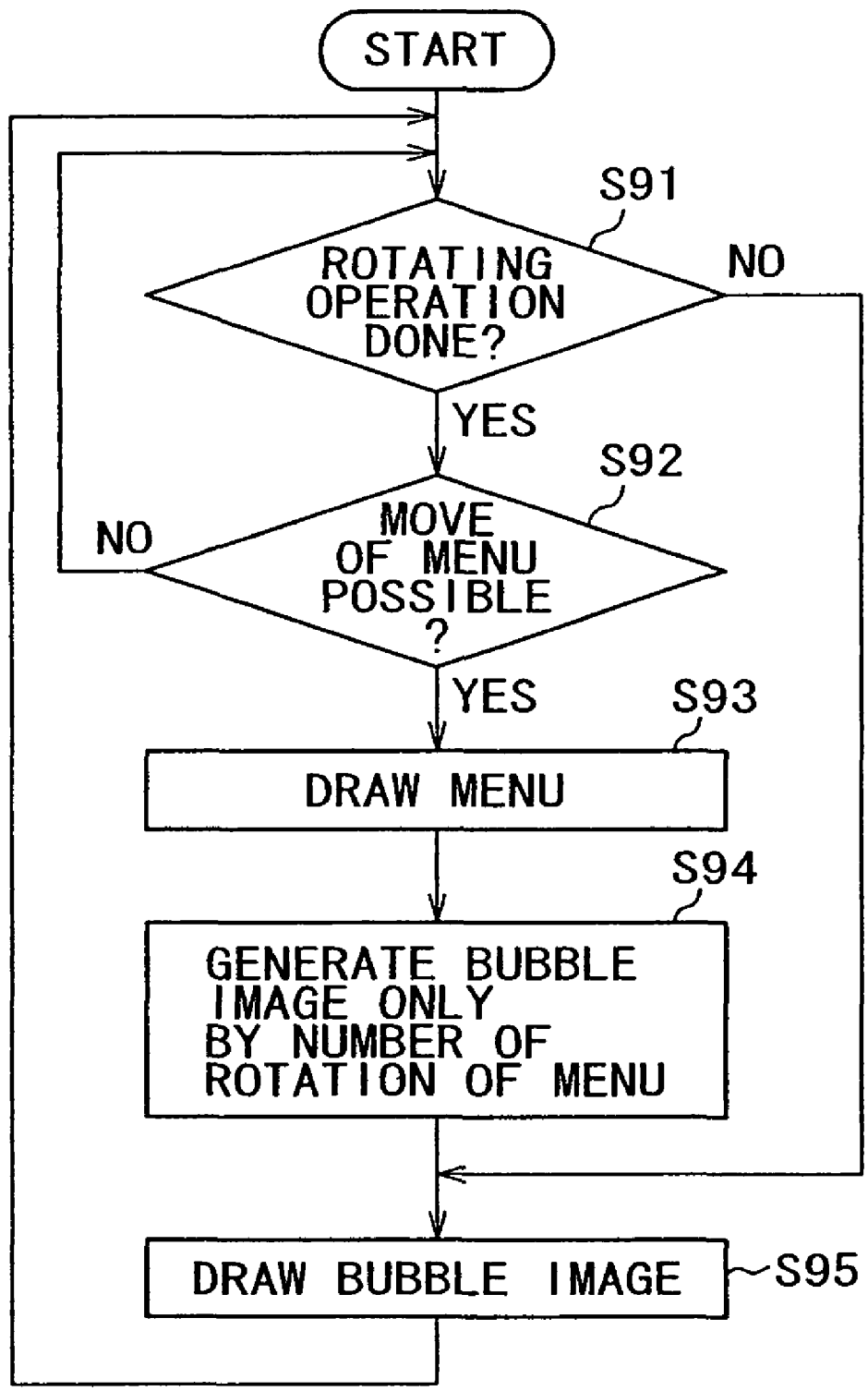
FIG. 21 is a flowchart for illustrating a flow required until the visual effect of "Liquid" is added to the menu.

FIG. 21 shows a flow required until the processing of drawing an image of the visual effect of "Liquid" is performed.

Firstly, the CPU 27 judges in Step S91 whether or not the rotating operation of the rotary dial 12 is carried out. In a case where the rotating operation of the rotary dial 12 is detected, the processing is moved on to Step S92, while in a case where no rotating operation of the rotary dial 12 is detected, the processing is moved on to Step S95.

As described above, in the case of this embodiment, the menu of the third hierarchy is supposed that the scroll of the menu is stopped at the starting end and terminating end. Thus, in the Step S92, the CPU 27 judges as to whether or not the scroll of the menu is possible in response to the turning operation of the rotary dial 12. Then, in a case where the scroll of the menu is judged to be not possible, the processing is returned to the Step S91, where the monitoring of the rotating operation of the rotary dial 12 follows.

In a case where the scroll of the menu is judged to be possible, the CPU 27 moves the processing on to Step. S93, then, in the Step S93, controls that the menu of either hierarchy is displayed on the display unit 4 as described above in response to the rotating operation of the rotary dial 12, and then moves the processing on to Step S94.

In the Step S94, the CPU 27 creates an image of bubbles of the size and the number respectively corresponding to the number of scroll of the menu. Then, the processing of drawing the image of the bubbles on the display unit 3 is performed in Step S95. Hereby, the image of the bubbles of the size and the number respectively corresponding to the amount of the rotating operation of the rotary dial 12 come to be drawn on the display unit 4.

On the other hand, in a case where no rotating operation of the rotary dial 12 is detected in the Step S91, the CPU 27 performs the processing of drawing the image of the bubbles in such a manner as to gradually reduce the size of bubbles and also the number of bubbles correspondingly to the time that has elapsed from the time when the rotating operation was stopped from being detected (=the idle time).

Hereby, the bubbles whose size is gradually reduced and also whose number is gradually reduced correspondingly to the time that has elapsed since the rotating operation of the rotary dial 12 was stopped from being detected come to be controlled the display on the display unit 4.

[On/Off Setting of Visual Effect]

The above visual effect is supposed to be capable of being set on or off by the user at will.

Specifically, information on the on/off setting of the visual effect is supposed to be stored in the memory 23 shown in FIG. 2 by the user. When the rotary dial 12 is rotated, the CPU 27 reads out the information on the on/off setting of the visual effect from the memory 23. In a case where the visual effect is set on, the CPU controls the display of the menu by adding the visual effect as described above. In a case where the visual effect is set off, the CPU controls the display of the menu without adding the visual effect.

The addition of the visual effect is capable of being set off as described above, whereby a power saving is attained. Further, in the case of the display of the menu, the CPU 27 requires no processing corresponding to the visual effect, so that an increased response speed to the display of the menu etc. is attained.

[Effects of Best Mode for Carrying Out the Invention]

1. In the mobile phone system available as the best mode for carrying out the present invention, the menu is of the hierarchical structure composed of the first to the third hierarchies, wherein at least the menus of the first and the second hierarchies are in the seamless connected arrangement. Then, at least the menus of the first and the second hierarchies are supposed to be displayed on one display simultaneously.

When the rotary dial 12 is rotated, the CPU 27 controls that the seamlessly connected menus of the first and the second hierarchies are rotationally displayed depending on the amount and the speed of the rotating operation of the rotary dial 12. In this case, the CPU 27 performs the display control by adjusting the display angle of each menu as if the centrifugal force caused by the rotation acted on the rotationally displayed menu.

When the stop of the rotating operation of the rotary dial 12 is detected, the CPU 27 also performs the display of the menu so as to gradually restore the added angle to the initial display angle (at the position placed directly in the front).

Hereby, the seamlessly connected menu is controlled in the manner of being rotationally displayed in the direction corresponding to the operation direction of the rotary dial 12, so that it is possible to produce a feeling of unity as if the menu is on the rotary dial 12. Thus, the rotation of the menu may be prevented from leading to user's confusion, whereby the selection of the desired menu among the large number of menus may be easily performed.

Further, the display angle of the menu is widened in the radial manner in proportion to the rotational display speed of the menu, so that it is possible to give to the user the feeling as if the centrifugal force acted on the menu, whereby a feeling of accustomed operation like the actual world may be provided.

Further, when the rotating operation of the rotary dial 12 is stopped, the radially widened display angle of the menu is restored directly to the original display angle, so that it is also possible to hold a menu visibility.

2. When the menu of the first hierarchy is rotationally operated, the menu of the second hierarchy also rotates following the rotation of the menu of the first hierarchy, while when the menu of the second hierarchy is rotationally operate, the menu of the first hierarchy rotates following the rotation of the menu of the second hierarchy. Thus, it is possible to allow the user to recognize sensibly the menu of the hierarchy at the operated side.

3. The rotating direction of the menu to the direction of the rotating operation of the rotary dial 12 may be changed with the right soft key 13 or the left soft key 14, that is, by so-called one-touch operation. Thus, it is possible to provide a mobile phone system adaptable to a difference between the users in the feeling of operation or in the hand more skillful than the other.

4. As shown in FIG. 8, the range (displayed with the first cursor 31) of the second hierarchy menu corresponding to the selected first hierarchy, at which the cursor CR is placed at present, in the whole menu of the second hierarchy in the seamless connected arrangement and the menu (displayed with the second cursor 32) of the second hierarchy at which the cursor CR is placed at present, in the menu of the second hierarchy corresponding to the first hierarchy, are supposed to be displayed.

Thus, it is possible to allow the user to recognize how much information among the whole information is displayed on the present display and that the menu in the display is about which menu among the whole menu simultaneously.

Thus, it is possible to allow the user to recognize the amount of the rotating operation of the rotary dial 12 and the number of scroll of the menu by intuition to ensure that a useless rotating operation of the rotary dial 12 may be prevented.

When the seamless connection of the menu leads to a shift of the whole menu location, so that it is difficult to remember which menu was placed whereabouts. However, the installation of the scrollbar 30 allows the user to grasp the approximate position of the menu to be retrieved.

5. The addition of the visual effects such as the air and the liquid etc. corresponding to the moving direction or the moving speed. etc. of the menu permits the visual effect corresponding to the moving direction or the moving speed of the menu to be added, so that it is possible to prevent a disadvantage that the user misses the moving direction of the menu.

Also, the volume of visual effect added varies with the number of scroll or the scroll speed of the menu, so that it is possible to grasp the number of scroll or the scroll speed of the menu by intuition, and also to give the user the pleasure in operating the rotary dial 12.

Further, the transparency of the cursor CR is adjusted depending on the scroll speed of the menu, whereby it is possible to produce the feeling of speediness of the scroll of the menu. The increased visibility of the menu at the time of high-speed scrolling may be also attained.

Furthermore, the off setting of the visual effect added to the menu permits the power saving of a battery of the mobile phone system to be attained. In the case of the display of the menu, the CPU 27 also requires no processing corresponding to the visual effect, so that the increased response speed to the display of the menu etc. may be also attained.

Incidentally, the above description states the application of the present invention to the mobile phone system, or alternatively, it is also allowable to apply the present invention to a terminal apparatus such as a PHS (Personal Handyphone System), a PDA (Personal Digital Assistant) and a personal computer etc.

At last, the above best mode for carrying out the present invention is merely one instance of the present invention. Thus, it is to be understood that the present invention is not restrictive to the above mode, and various modification are of course possible depending on the design or the like without departing from the range of the technical concept of the present invention.

INDUSTRIAL APPLICABILITY

The present invention may be applied to the terminal apparatus such as the mobile phone system, the PHS (Personal Handyphone System), the PDA (Personal Digital Assistant) and the personal computer apparatus.

What is claimed is:

1. An information processing apparatus comprising:
   storage means containing a plurality of menus;
   operation means for performing an operation of scrolling said plurality of menus;
   display means for displaying, on a display unit, said plurality of menus stored in said storage means;
   scroll speed determination means for determining, depending on the scrolling operation performed with said operation means, a scroll speed of said menus; and
   display control means for controlling said display means, in a case where the scrolling operation is performed by said operation means, to perform a scrolling display of said plurality of menus displayed on said display unit at a scroll speed determined by said scroll speed determination means and to display a visual effect in which a speed of a movement of the visual effect and a display size of the visual effect are varied depending on the scroll speed determined by said scroll speed determination means,
   wherein said display control means controls said display means, in a case where the scrolling operation of said menus by said operation means is stopped, in a manner that the visual effect displayed on said display means gradually decreases in its speed and size with time.

2. The information processing apparatus according to claim 1, further comprising:
   scroll direction detection means for detecting a scroll direction of said menus depending on the scrolling operation by said operation means, wherein:
   said display control means controls said display means to position the visual effect in which the display speed and the display size are varied depending on the scroll speed determined by said scroll speed determination means on a display position of the display unit, which corresponds to the scroll direction detected by said scroll direction detection means.

3. The information processing apparatus according to claim 1, further comprising:
   effect operation means for setting on/off of displaying said visual effect, wherein:
   said display control means controls said display means, in a case where displaying of the visual effect is set on by said effect operation means, to display said visual effect.

4. The information processing apparatus according to claim 1, wherein:
   said display control means controls said display means to display a cursor for selecting said menus on said display unit at a transparency corresponding to the scroll speed determined by said scroll speed determination means.

5. An information processing method for an information processing apparatus having storage means in which a plurality of menus are stored, operation means for performing a scrolling operation of said plurality of menus and a display unit which displays said plurality of menus stored in said storage means, said method comprising:
   a displaying step of displaying said plurality of menus on said display unit;
   a scroll speed determining step of determining a scroll speed of said menus in accordance with the scrolling operation of said operation means; and
   a display controlling step of controlling said display unit, in a case where the scrolling operation is performed by said operation means, to perform a scrolling display of said plurality of menus displayed on said display unit at a scroll speed determined by said scroll speed determination means and to display a visual effect in which a speed of a movement of the visual effect and a display size of the visual effect are varied depending on the scroll speed determined by said scroll speed determination means,
   wherein said display control means controls said display means, in a case where the scrolling operation of said menus by said operation means is stopped, in a manner that the visual effect displayed on said display means gradually decreases in its speed and size with time.

6. A non-transitory computer-readable storage medium having stored therein an information processing program executed in an information processing apparatus having storage means in which a plurality of menus are stored, operation means for performing a scrolling operation of said plurality of menus and a display unit which displays said plurality of menus stored in said storage means, said program causing the information processing apparatus execute:
   a displaying step of displaying said plurality of menus on said display unit;
   a scroll speed determining step of determining a scroll speed of said menus in accordance with the scrolling operation of said operation means; and
   a display controlling step of controlling said display unit, in a case where the scrolling operation is performed by said operation means, to perform a scrolling display of said plurality of menus displayed on said display unit at a scroll speed determined by said scroll speed determination means and to display a visual effect in which a speed of a movement of the visual effect and a display size of the visual effect are varied depending on the scroll speed determined by said scroll speed determination means, wherein said display control means controls said display means, in a case where the scrolling operation of said menus by said operation means is stopped, in a manner that the visual effect displayed on said display means gradually decreases in its speed and size with time.

* * * * *